US008000651B2

(12) United States Patent
Horiuchi et al.

(10) Patent No.: US 8,000,651 B2
(45) Date of Patent: Aug. 16, 2011

(54) WIRELESS TRANSMISSION APPARATUS AND WIRELESS TRANSMISSION METHOD

(75) Inventors: Ayako Horiuchi, Kanagawa (JP); Akihiko Nishio, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 613 days.

(21) Appl. No.: 11/814,999

(22) PCT Filed: Jan. 30, 2006

(86) PCT No.: PCT/JP2006/301479
§ 371 (c)(1),
(2), (4) Date: Jul. 27, 2007

(87) PCT Pub. No.: WO2006/080507
PCT Pub. Date: Aug. 3, 2006

(65) Prior Publication Data
US 2009/0011702 A1    Jan. 8, 2009

(30) Foreign Application Priority Data

Jan. 31, 2005   (JP) .................................. 2005-022898

(51) Int. Cl.
*H04B 7/15* (2006.01)
(52) U.S. Cl. .................................. 455/11.1; 375/240.27
(58) Field of Classification Search ............. 455/7, 11.1, 455/13.1, 9
See application file for complete search history.

(56) References Cited

U.S. PATENT DOCUMENTS

| 6,078,785 | A  | * | 6/2000 | Bush | 455/7 |
|---|---|---|---|---|---|
| 7,224,954 | B2 | | 5/2007 | Okajima et al. | |
| 2001/0018328 | A1 | | 8/2001 | Ohkura et al. | |
| 2003/0124976 | A1 | | 7/2003 | Tamaki | |
| 2005/0014464 | A1 | * | 1/2005 | Larsson | 455/11.1 |

FOREIGN PATENT DOCUMENTS

JP         2001 189971         7/2001
(Continued)

OTHER PUBLICATIONS

P. Herhold, et al., "A Simple Cooperative Extension to Wireless Relaying," International Zurich Seminar on Communications, IEEE, Feb. 2004, pp. 36-39.
P. Tarasak, et al., "Differential Modulation for Two-User Cooperative Diversity Systems," IEEE Global Telecommunications Conference, Nov. 2004, pp. 3389-3393.
(Continued)

*Primary Examiner* — Tu X Nguyen
(74) *Attorney, Agent, or Firm* — Dickinson Wright PLLC

(57) ABSTRACT

A wireless transmission apparatus capable of suppressing a reduction in coverage area of a base station apparatus and improving the transmission rate in the coverage area. According to this apparatus, a mobile station (10) generates a transport signal addressed to a base station (30) and transmits it to a plurality of relay stations (20-1,20-2), each of which then generates a relay signal from the transport signal and transmits the relay signal to the base station (30). A relay instructing part (115) of the mobile station (10) decides first and second different instructions having their respective instruction contents for the generation of the relay signals. The relay instructing part (115) then sends the first instruction to the relay station (20-1), which is one of the plurality of relay stations (20-1,20-2), while sending the second instruction to the relay station (20-2), which is another one of the plurality of relay stations (20-1,20-2).

14 Claims, 19 Drawing Sheets

FOREIGN PATENT DOCUMENTS

| | | |
|---|---|---|
| JP | 2001 244864 | 9/2001 |
| JP | 2002 223188 | 8/2002 |
| JP | 2003-198442 | 7/2003 |
| JP | 2003 229798 | 8/2003 |
| JP | 2003 244050 | 8/2003 |

OTHER PUBLICATIONS

B. Zhao, et al., "Distributed turbo coded diversity for relay channel," Electronics Letters, IEEE, vol. 39, No. 10, May 2003, pp. 786-787.
PCT International Search Report dated Mar. 20, 2006.

* cited by examiner

| PATTERN# | THE NUMBER OF RELAY STATIONS | INITIAL TRANSMISSION | RETRANS-MISSION1 | RETRANS-MISSION2 | RETRANS-MISSION3 | RETRANS-MISSION4 | RETRANS-MISSION5 | RETRANS-MISSION6 | RETRANS-MISSION7 |
|---|---|---|---|---|---|---|---|---|---|
| 1 | 1 | a | b | c | d | e | f | g | h |
| 2 | 2 | a | b | c | d | | | | |
| 3 | 2 | e | f | g | h | | | | |
| 4 | 3 | a | b | c | | | | | |
| 5 | 3 | d | e | f | | | | | |
| 6 | 3 | g | h | i | | | | | |
| 7 | 4 | a | b | | | | | | |
| 8 | 4 | c | d | | | | | | |
| 9 | 4 | e | f | | | | | | |
| 10 | 4 | g | h | | | | | | |

FIG.8

| ERROR CORRECTION CODE | CHANNEL FOR USE |
|---|---|
| a | CHANNEL 1 |
| b | CHANNEL 2 |
| c | CHANNEL 3 |
| d | CHANNEL 4 |
| e | CHANNEL 5 |
| f | CHANNEL 6 |
| g | CHANNEL 7 |
| h | CHANNEL 8 |

FIG.18

WIRELESS TRANSMISSION APPARATUS AND WIRELESS TRANSMISSION METHOD

TECHNICAL FIELD

The present invention relates to a radio transmitting apparatus and radio transmitting method. Particularly, the present invention relates to a radio transmitting apparatus and radio transmitting method for transmitting a signal to a communicating party apparatus through a relay station apparatus.

BACKGROUND ART

In recent years, in cellular mobile communication systems represented by, for example, cellular telephones, technical approaches are studied actively to implement high transmission rates by using high-frequency radio bands. When the high-frequency radio band is used, attenuation due to transmission distance becomes greater than a case of using low-frequency radio bands, and domains where high transmission rates are expected to be implemented are limited to domains within relatively shorter distances. Therefore, it is necessary to install a larger number of base station apparatuses in the system. Further, it is costly to install a base station apparatus. Therefore, a technique is demanded for suppressing increases in the number of installed base station apparatuses and implementing of high transmission rates.

In an example of conventional mobile communication systems, a radio receiving apparatus (for example, a mobile station apparatus) combines a transmission signal transmitted from a radio transmitting apparatus (for example, base a station apparatus) to the radio receiving apparatus, and relay signals transmitted to the radio receiving apparatus by relaying the transmission signal at a plurality of relay station apparatuses (for example, see Patent Document 1). The diversity effect is thus achieved.

Patent Document 1: Japanese Patent Application Laid-Open No. 2001-189971

DISCLOSURE OF INVENTION

Problems to be Solved by the Invention

However, in the above conventional mobile communication system, a plurality of same signals are transmitted through a plurality of routes and combined on the receiving apparatus side. Therefore, the advantage provided by combining processing is only a power amplifying effect. Accordingly, improvement in error correction performance on the receiving apparatus side is limited to the certain degree.

It is an object of the invention to provide a radio transmitting apparatus and radio transmitting method which makes it possible to improve error rate characteristics of combined received signals.

Means for Solving the Problem

A radio transmitting apparatus of the present invention is a radio transmitting apparatus that transmits a transmission signal for a communicating party apparatus to a plurality of relay station apparatuses that each carry out processing of generating a relay signal from the transmission signal and transmitting the relay signal to the communicating party apparatus, employs a configuration including: a determining section that determines a first command and a second command which are each unique and which each provide details regarding the generation of the relay signal; and a reporting section that reports a determined first command to a first relay station apparatus out of the plurality of relay station apparatuses, and reports a determined second command to a second relay station apparatus different from the first relay station apparatus out of the plurality of relay station apparatuses.

A radio transmitting method of the present invention in a radio transmitting apparatus of transmitting a transmission signal for a communicating party apparatus to a plurality of relay station apparatuses which carry out processing of generating relay signals from the transmission signal and transmitting the relay signals to the communicating party apparatus, includes: determining a first command and a second command which are each unique and which each provide details regarding the generation of the relay signal; and reporting a determined first command to a first relay station apparatus out of the plurality of relay station apparatuses, and reporting a determined second command to a second relay station apparatus different from the first relay station apparatus out of the plurality of relay station apparatuses.

ADVANTAGEOUS EFFECT OF THE INVENTION

According to the invention, it is possible to improve error rate characteristics of combined received signals.

BRIEF DESCRIPTION OF DRAWINGS

FIG. 8 is a diagram showing a table of error correction code patterns according to Embodiment 1 of the present invention;

FIG. 18 shows a table indicating correspondence between the error correction codes and channels according to Embodiment 3 of the present invention.

BEST MODE FOR CARRYING OUT THE INVENTION

Now, embodiments of the present invention will be described in detail with reference to the accompanying drawings.

Embodiment 1

Figure 1:
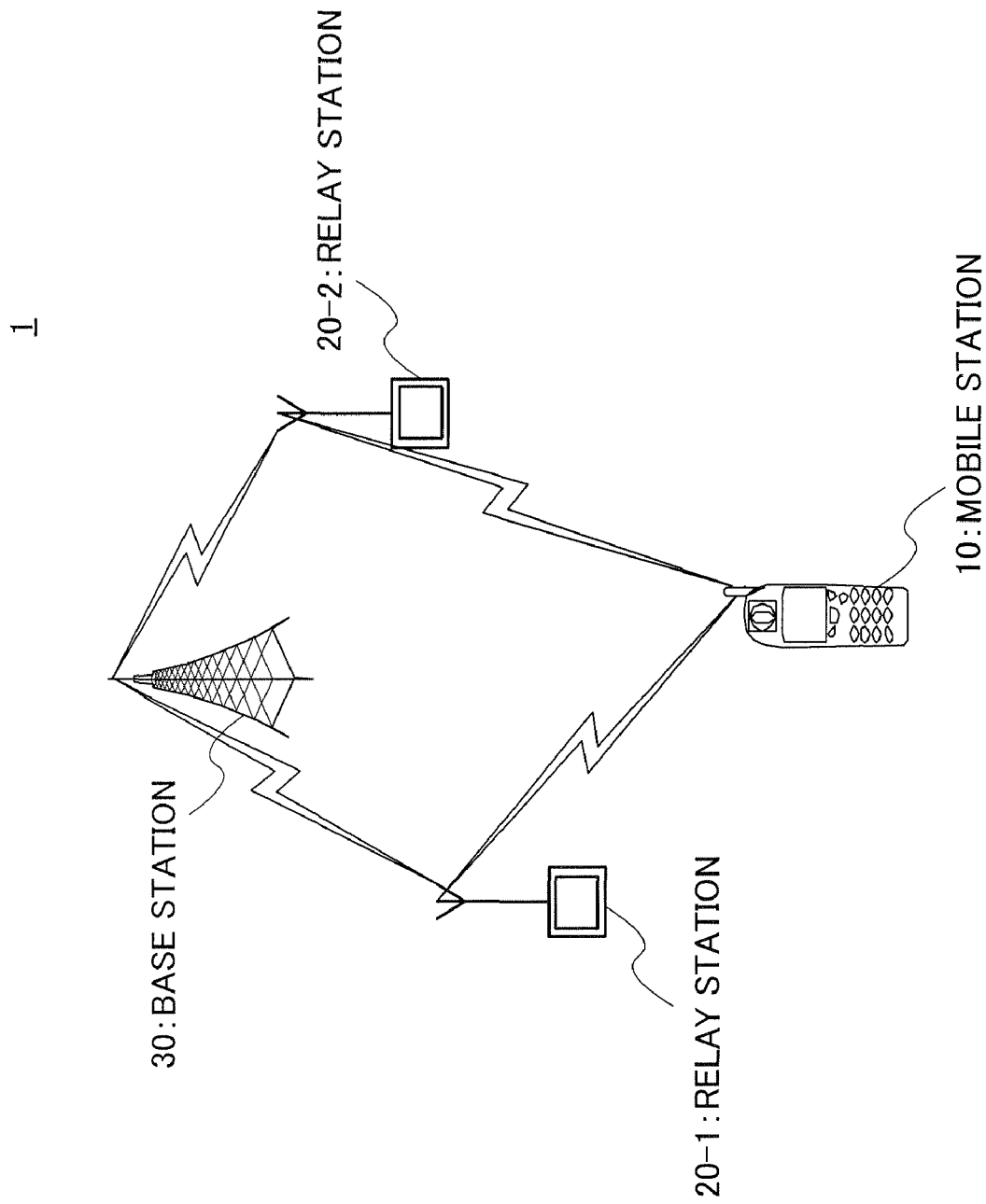
FIG. 1 is a diagram showing a configuration of a mobile communication system according to Embodiment 1 of the present invention.

FIG. 1 shows a configuration of a mobile communication system according to Embodiment 1 of the present invention. Mobile communication system 1 of FIG. 1 has mobile station apparatus (hereinafter, referred to as a "mobile station") 10, two relay station apparatuses (hereinafter, each referred to as a "relay station") 20-1 and 20-2 and base station apparatus (hereinafter, referred to as a "base station") 30.

In addition, relay stations 20-1 and 20-2 have the same internal configuration. In the following description, when either one of relay stations 20-1 and 20-2 will be referred to as "relay station 20." Further, in the present embodiment, although the number of relay stations is two for convenience, the number of relay station may be one or three or more. There may be cases where a transmission signal is transmitted through one relay station. However, to implement the present invention, a transmission signal is transmitted preferably through two or more relay stations.

In mobile communication system 1, mobile station 10 transmits a signal (transmission signal) for base station 30 to relay stations 20-1 and 20-2. Relay stations 20-1 and 20-2 receive the transmission signal. Relay stations 20-1 and 20-2 carry out relay processing by generating relay signals from the received transmission signal (received signal) and transmitting the relay signals to base station 30. Base station 30 receives relay signals respectively transmitted from relay stations 20-1 and 20-2, and combines received relay signals.

A configuration and operation of apparatuses will be described below from mobile station 10, relay station 20 to base station 30.

Figure 2:
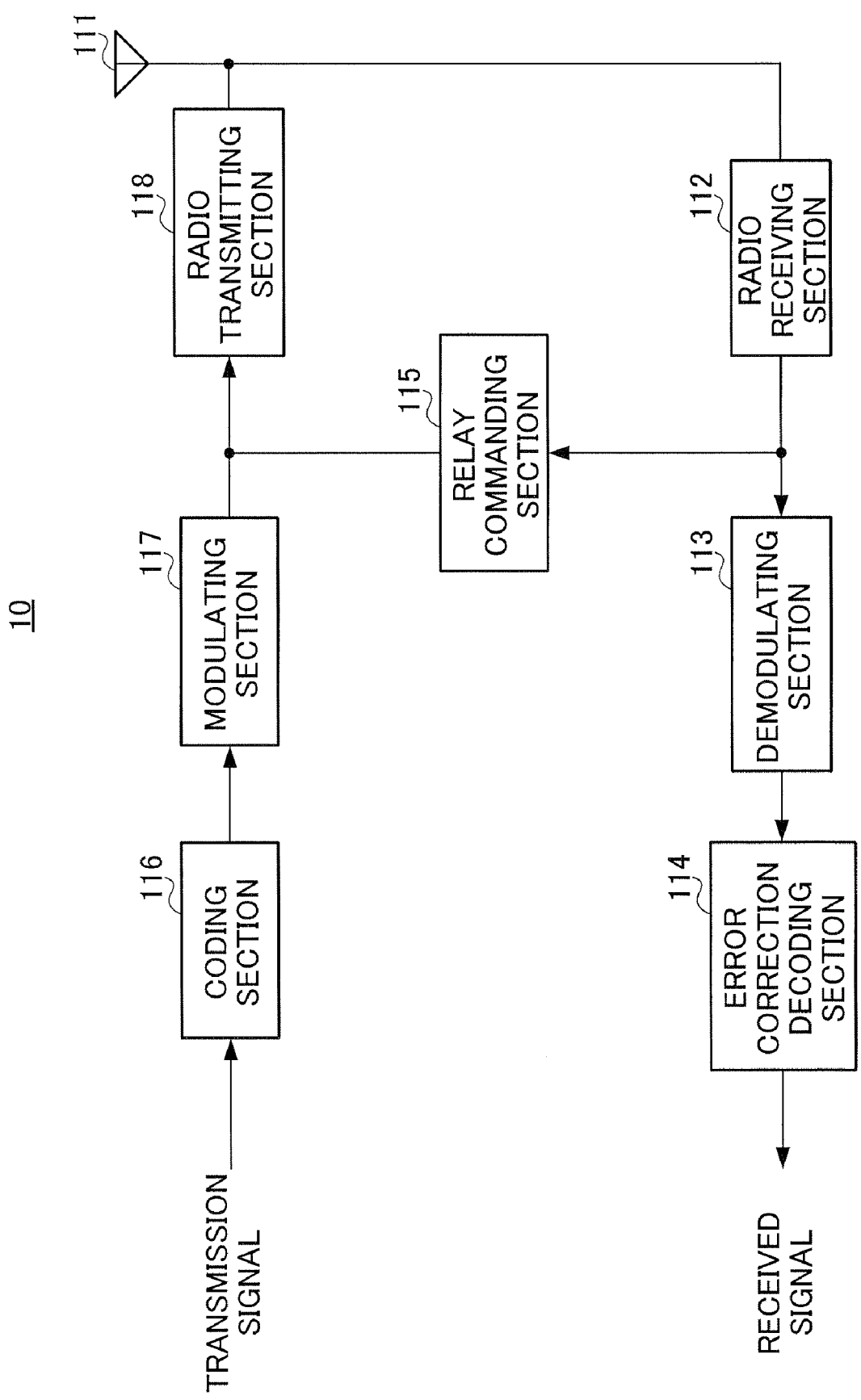
FIG. 2 is a block diagram showing a mobile station apparatus according to Embodiment 1 of the present invention.

As shown in FIG. 2, mobile station 10 has antenna 111, radio receiving section 112, demodulating section 113, error correction decoding section 114, relay command section 115, coding section 116, modulating section 117 and radio transmitting section 118.

Radio receiving section 112 receives a downlink signal transmitted from another apparatus such as base station 30 through antenna 111. The downlink signal includes a user signal for mobile station 10 and signaling information such as information (reception quality information) of reception quality of the signals received from relay stations 20-1 and 20-2 in base station 30. Then, radio receiving section 112 carries out predetermined radio receiving processing (for example, down-conversion and A/D conversion) on the received downlink signal. The downlink signal after radio receiving processing is outputted to demodulating section 113 and relay commanding section 115.

Demodulating section 113 demodulates the signal inputted from radio receiving section 112, and outputs the demodulated signal to error correction decoding section 114. Error correction decoding section 114 carries out error correction decoding processing on the signal inputted from demodulating section 113, and outputs the result as a received signal.

Relay commanding section 115 learns through which relay station a transmission signal is transmitted to base station 30. In the present embodiment, it is learned that the transmission signal is transmitted in parallel through relay stations 20-1 and 20-2. To learn above, for example, relay commanding section 115 acquires reception quality information from the signal inputted from radio receiving section 112, and learns the presence of relay stations based on the acquired reception quality information. In other words, relay commanding section 115 functions as an acquiring means.

Further, relay commanding section 115 functions as a determining means. Relay commanding section 115 determines details of the separate command for generating a relay signal for relay stations 20-1 and 20-2, generates a relay command signal indicating the determined command, and outputs the generated relay command signal to radio transmitting section 118.

Coding section 116 as an adding means carries out error correction coding processing on the transmission signal for base station 30. As a result of this error correction coding processing, parity bits are added to the transmission signal. Modulating section 117 modulates the transmission signal encoded in coding section 116. The transmission signal modulated by modulating section 117 is outputted to radio transmitting section 118.

Radio transmitting section 118 as a reporting means carries out predetermined radio transmitting processing (for example, D/A conversion and up-conversion) on the relay command signal inputted from relay commanding section 115. Then, the relay command signal after radio transmitting processing is transmitted to relay stations 20-1 and 20-2 from antenna 111. Further, radio transmitting section 118 carries out predetermined radio transmitting processing on the transmission signal inputted from modulating section 117. Then, the transmission signal after radio transmitting processing is transmitted to relay stations 20-1 and 20-2 from antenna 111.

Figure 3:
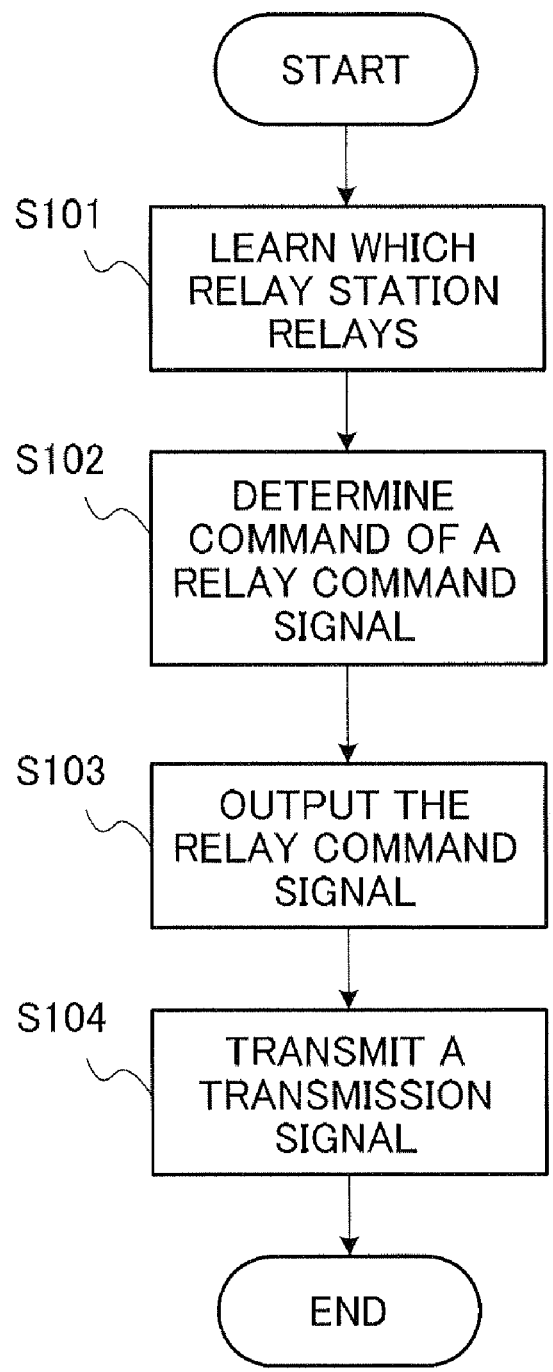
FIG. 3 is a flow diagram showing operation of the mobile station apparatus according to Embodiment 1 of present the invention.

Mobile station 10 having the above configuration operates according to the flow shown in FIG. 3 as an example.

First, relay commanding section 115 learns which relay station carries out relaying (S101). In the present embodiment, a transmission signal is relayed by relay stations 20-1 and 20-2.

Next, relay commanding section 115 determines details of the relay command signal (S102).

For example, the error correction codes used in error correction coding processing for generating relay signals from transmission signals are separately determined for relay stations 20-1 and 20-2. That is, these error correction codes are determined as the details of the relay command signals for generating the relay signals reported to relay stations 20-1 and 20-2. Herein, the error correction code determined as the command for relay station 20-1 is different from the error correction code determined as the command for relay station 20-2. Specific examples of the details will be described later.

Next, relay commanding section 115 generates a relay command signal indicating the determined details. The generated relay command signal is outputted to radio transmitting section 118 from relay commanding section 115 (S103).

Radio transmitting section 118 transmits the relay command signal inputted from relay commanding section 115 to relay stations 20-1 and 20-2. Thus, the details indicated in the relay command signal (that is, the error correction code used in generating the relay signal) are reported to relay stations 20-1 and 20-2.

After the processing in step S103 (that is, after the relay command signal is transmitted), radio transmitting section 118 reports the transmission signal to relay stations 20-1 and 20-2 (S104).

In addition, during wireless transmission from mobile station 10 to relay stations 20-1 and 20-2, the processing in steps S102 to S104 is carried out repeatedly. However, when the error correction code to be commanded is not changed, transmission of the relay command signal may be omitted, and only the processing in step S104 (that is, transmission of the transmission signal) may be carried out successively.

Further, in the above flow, the relay command signal and transmission signal are transmitted separately. However, the transmission method of each signal is not limited to the above method. For example, by adding the relay command signal to a header of the transmission signal at radio transmitting section 118, the relay command signal may be transmitted together with the transmission signal.

Figure 4:
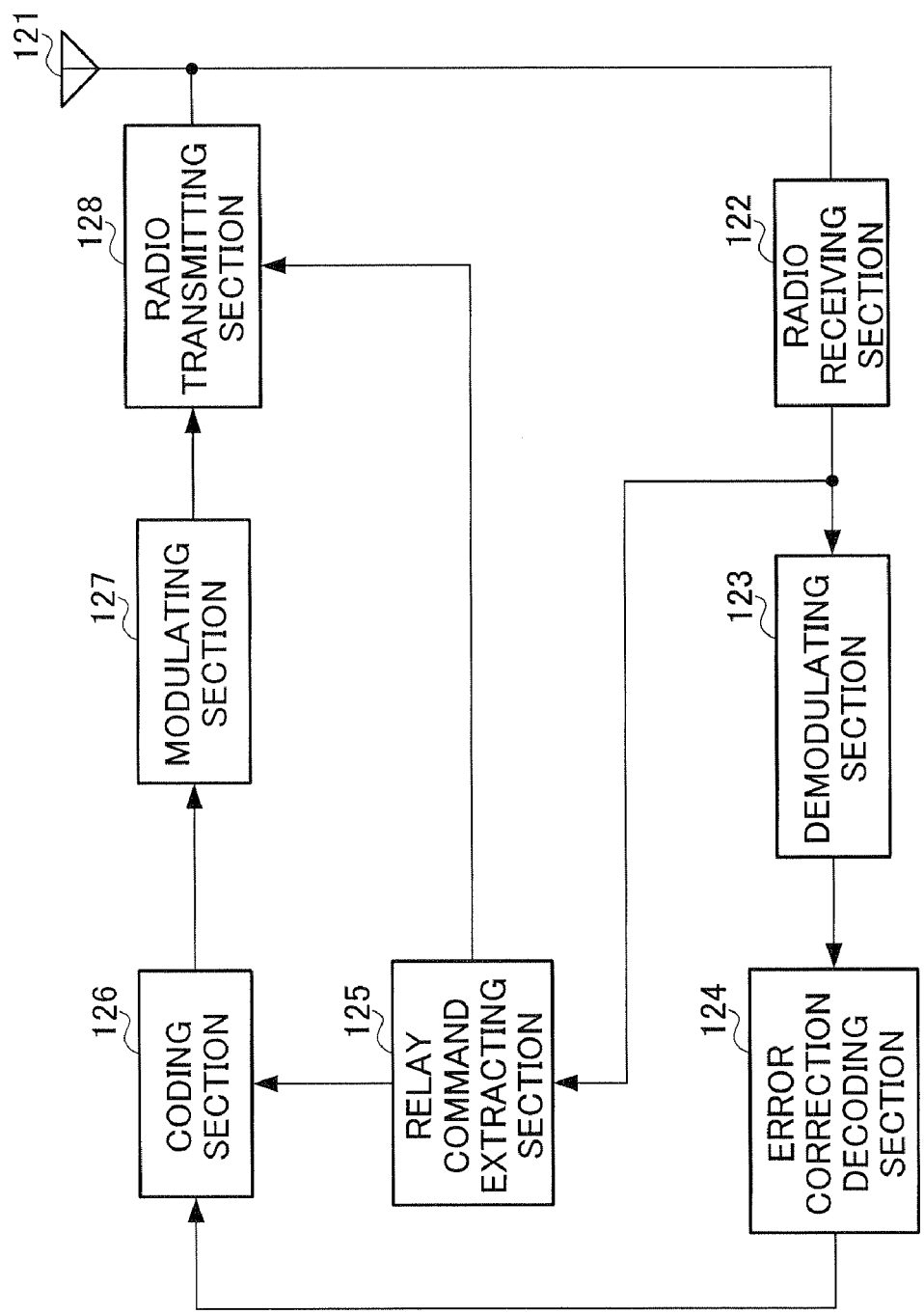
FIG. 4 is a block diagram showing a configuration of a relay station apparatus according to Embodiment 1 of the present invention.

As shown in FIG. 4, relay station 20 has antenna 121, radio receiving section 122, demodulating section 123, error correction decoding section 124, relay command extracting section 125, coding section 126, modulating section 127 and radio transmitting section 128.

Radio receiving section 122 receives the transmission signal or relay command signal transmitted from mobile station 10 through antenna 121. Then, radio receiving section 122 carries out predetermined radio receiving processing (for example, down-conversion and A/D conversion) on the received transmission signal (received signal) or relay command signal. The received signal or relay command signal after radio receiving processing is outputted to demodulating section 123 and relay command extracting section 125.

Demodulating section 123 demodulates the received signal out of the signals inputted from radio receiving section 122. Error correction decoding section 124 carries out error correction decoding processing on the received signal demodulated by demodulating section 123. The received signal subjected to error correction decoding processing in error correction decoding section 124 is outputted to coding section 126.

Relay command extracting section 125 extracts the relay command signal out of the signals inputted from radio receiving section 122, and then outputs the extracted relay command signal to radio transmitting section 128. Further, relay command extracting section 125 refers to the details indicated in the relay command signal, specifies the error correction code used in error correction coding processing carried out on the received signal and reports the specified error correction code to coding section 126.

Coding section 126 carries out the error correction coding processing on the received signal inputted from error correction decoding section 124 by using the error correction code inputted from relay command extracting section 125. The received signal encoded by coding section 126 is outputted to modulating section 127 as a relay signal. Modulating section 127 modulates the relay signal inputted from coding section 126. The relay signal modulated by modulating section 127 is outputted to radio transmitting section 128.

Radio transmitting section 128 carries out predetermined radio transmitting processing (for example, D/A conversion and up-conversion) on the relay command signal inputted from relay command extracting section 125. Then, radio transmitting section 128 transmits the relay command signal after radio transmitting processing to base station 30 from antenna 121. Further, radio transmitting section 128 carries out predetermined radio transmitting processing on the relay signal inputted from modulating section 127. Then, radio transmitting section 128 transmits the relay signal after radio transmitting processing to base station 30 from antenna 121.

Figure 5:
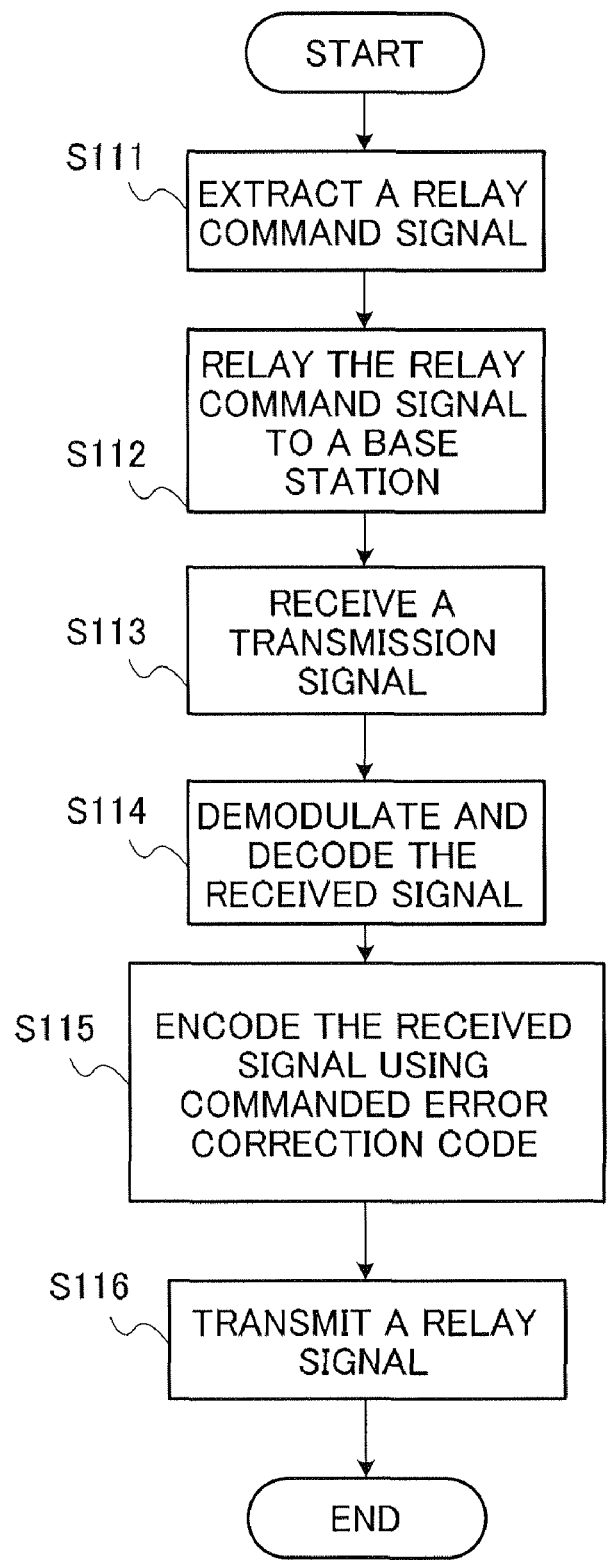
FIG. 5 is a flow diagram showing operation of the relay station apparatus according to Embodiment 1 of the present invention.

Relay station 20 having the above configuration operates according to the flow shown in FIG. 5 as an example.

First, relay command extracting section 125 extracts a relay command signal out of the output signals of radio receiving section 122 (S111). At this point, relay command extracting section 125 refers to the details indicated in the relay command signal, and specifies the error correction code used in error correction coding processing.

Then, the extracted relay command signal is relayed to base station 30 (S112). That is, the extracted relay command signal is outputted to radio transmitting section 128, and transmitted from radio transmitting section 128 to base station 30 through antenna 121. Then, the transmission signal transmitted from mobile station 10 is received in radio receiving section 122 (S113). This received signal is demodulated by demodulating section 123 as a received signal, decoded by error correction decoding section 124 and outputted to coding section 126 (S114).

Then, coding section 126 encodes the received signal (S115). The error correction code specified in step S111 is used in encoding the received signal. The encoded received signal is outputted to modulating section 127 as a relay signal. The relay signal is modulated, outputted to radio transmitting section 128 and transmitted to base station 30 from radio transmitting section 128 (S116).

Figure 6:
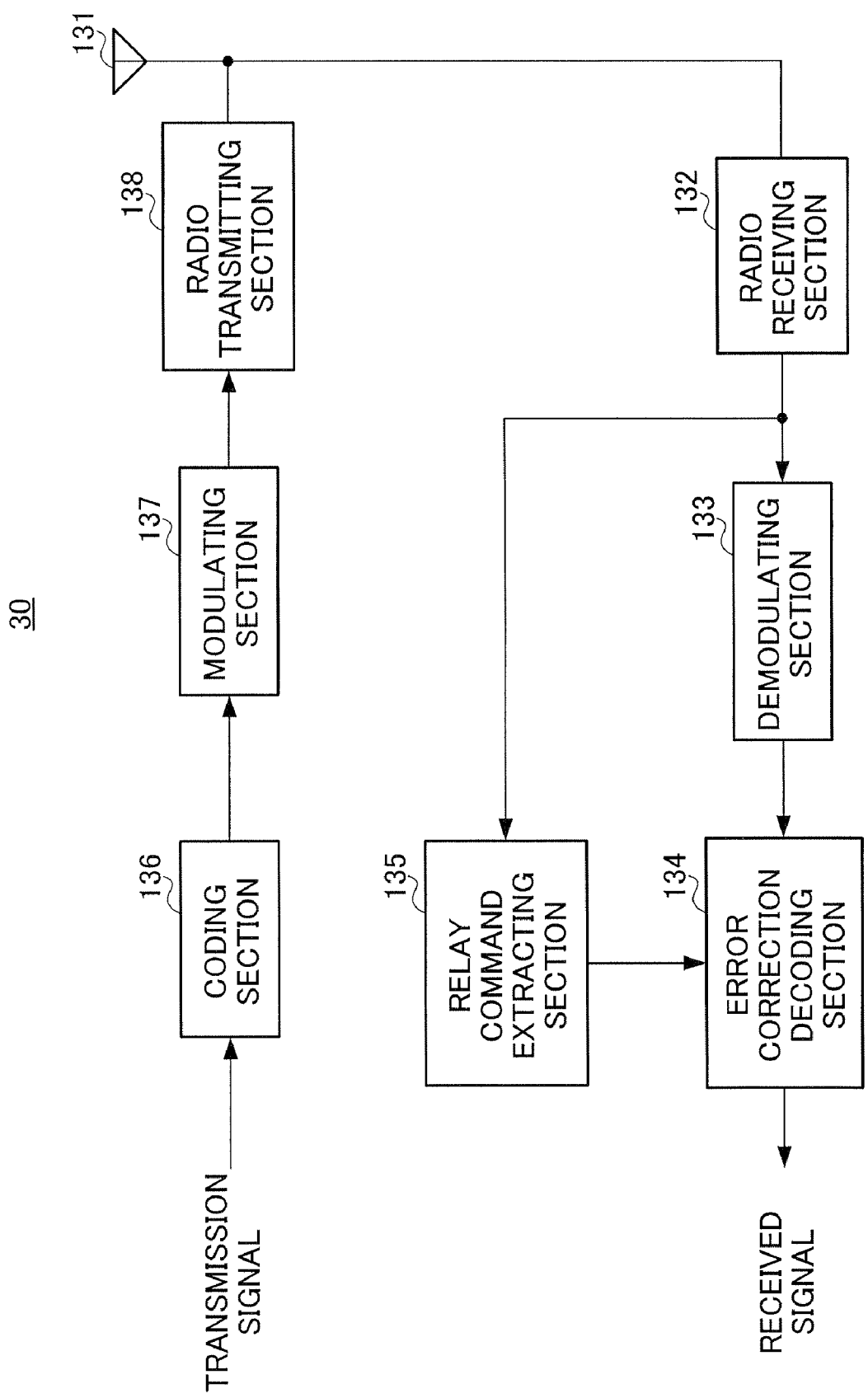
FIG. 6 is a block diagram showing a configuration of a base station apparatus according to Embodiment 1 of the present invention.

As shown in FIG. 6, base station 30 has antenna 131, radio receiving section 132, demodulating section 133, error correction decoding section 134, relay command extracting section 135, coding section 136, modulating section 137 and radio transmitting section 138.

Coding section 136 encodes a transmission signal for mobile station 10. The transmission signal includes, for example, information (reception quality information) indicating the reception quality of the signal received from relay stations 20-1 and 20-2. In addition, the reception quality of the signals received from relay stations 20-1 and 20-2 is measured in a reception quality measuring section (not shown).

The transmission signal encoded by coding section 136 is modulated by modulating section 137. Radio transmitting section 138 carries out predetermined radio transmitting processing (for example, D/A conversion and up-conversion) on the transmission signal modulated by modulating section 137. The transmission signal after radio transmitting processing is transmitted as a downlink signal to mobile station 10 through antenna 131.

Radio receiving section 132 receives the relay signal or relay command signal transmitted from relay stations 20-1 and 20-2 through antenna 131. Then, radio receiving section 132 carries out predetermined radio receiving processing (for example, down-conversion and A/D conversion) on the received relay signal or relay command signal. The relay signal or relay command signal after radio receiving processing is outputted to demodulating section 133 and relay command extracting section 135.

Demodulating section 133 demodulates the relay signal out of the signals inputted from radio receiving section 132. To be more specific, demodulating section 133 demodulates the relay signal received from relay station 20-1 and the relay signal received from relay station 20-2. Each demodulated relay signal is outputted to error correction decoding section 134.

Relay command extracting section 135 extracts the relay command signal out of the signals inputted from radio receiving section 132. Then, relay command extracting section 135 refers to the details indicated in the extracted relay command signal, thereby specifies the error correction code used in the error correction decoding processing carried out on a combined signal of the relay signals, and reports the specified error correction code to error correction decoding section 134.

Error correction decoding section 134 combines the relay signal received from relay station 20-1 and the relay signal received from relay station 20-2, which are inputted from demodulating section 133, and obtains the combined signal of the relay signals. Then, error correction decoding section 134 decodes the combined signal using the error correction code reported from relay command extracting section 135, and obtains a received signal.

Figure 7:
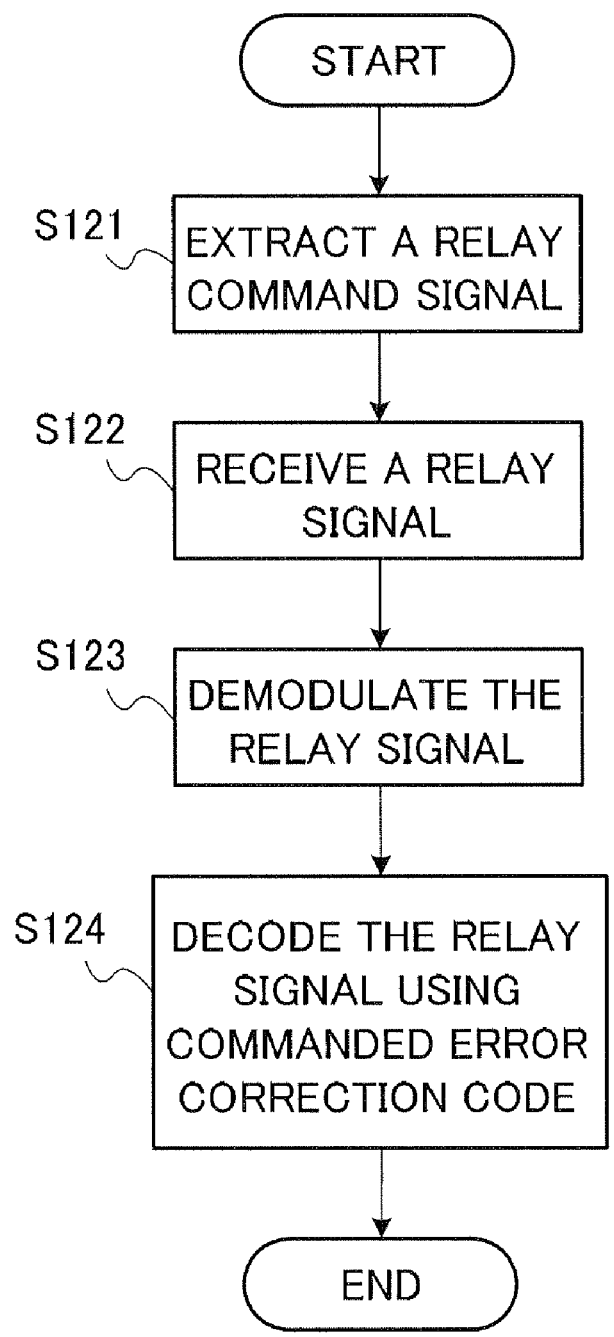
FIG. 7 is a flow diagram showing operation of the base station apparatus according to Embodiment 1 of the present invention.

Base station 30 having the above configuration operates according to the flow shown in FIG. 7 as an example.

First, relay command extracting section 135 extracts a relay command signal out of output signals of radio receiving section 132 (S121). At this point, relay command extracting section 135 refers to the details indicated in the relay command signal, and specifies the error correction code used in the error correction decoding processing.

Then, the relay signals respectively transmitted from relay stations 20-1 and 20-2 are received in radio receiving section 132 (S122). These relay signals are demodulated in demodulating section 133 (S123). Then, the relay signals are combined in error correction decoding section 134. The combined signal of the relay signals is thus obtained.

Then, error correction decoding section 134 decodes the combined signal of the relay signals (S124). The error correction code specified in step S121 is used in decoding the combined signal.

Next, an example of operation in entire mobile communication system 1 will be described.

Here, a case will be described as an example where a common table is used in mobile station 10, relay stations 20-2 and 20-2 and base station 30. FIG. 8 shows an example of the common table. Table T shown in FIG. 8 is stored respectively in relay commanding section 115 of mobile station 10, relay command extracting sections 125 of relay stations 20-1 and 20-2 and relay command extracting section 135 of base station 30.

A plurality of patterns of combinations of error correction codes are listed in table T. Pattern #1 is used when the number of relay station is one. Patterns #2 and #3 are used when the number of relay stations is two. Patterns #4 to #6 are used when the number of relay stations is three. Patterns #7 to #10 are used when the number of relay stations is four. As described, there are two relay stations, 20-1 and 20-2, in the present embodiment. Patterns #2 and #3 are used in this example of operation of mobile communication system 1 described here.

Pattern #2 designates error correction code a for use in initial transmission, error correction code b for use in first retransmission (retransmission 1), error correction code c for use in second retransmission (retransmission 2) and error correction code d for use in third retransmission (retransmission 3).

Pattern #3 designates error correction code e for use in initial transmission, error correction code f for use in first retransmission (retransmission 1), error correction code g for use in second retransmission (retransmission 2) and error correction code h for use in third retransmission (retransmission 3).

Figure 9:
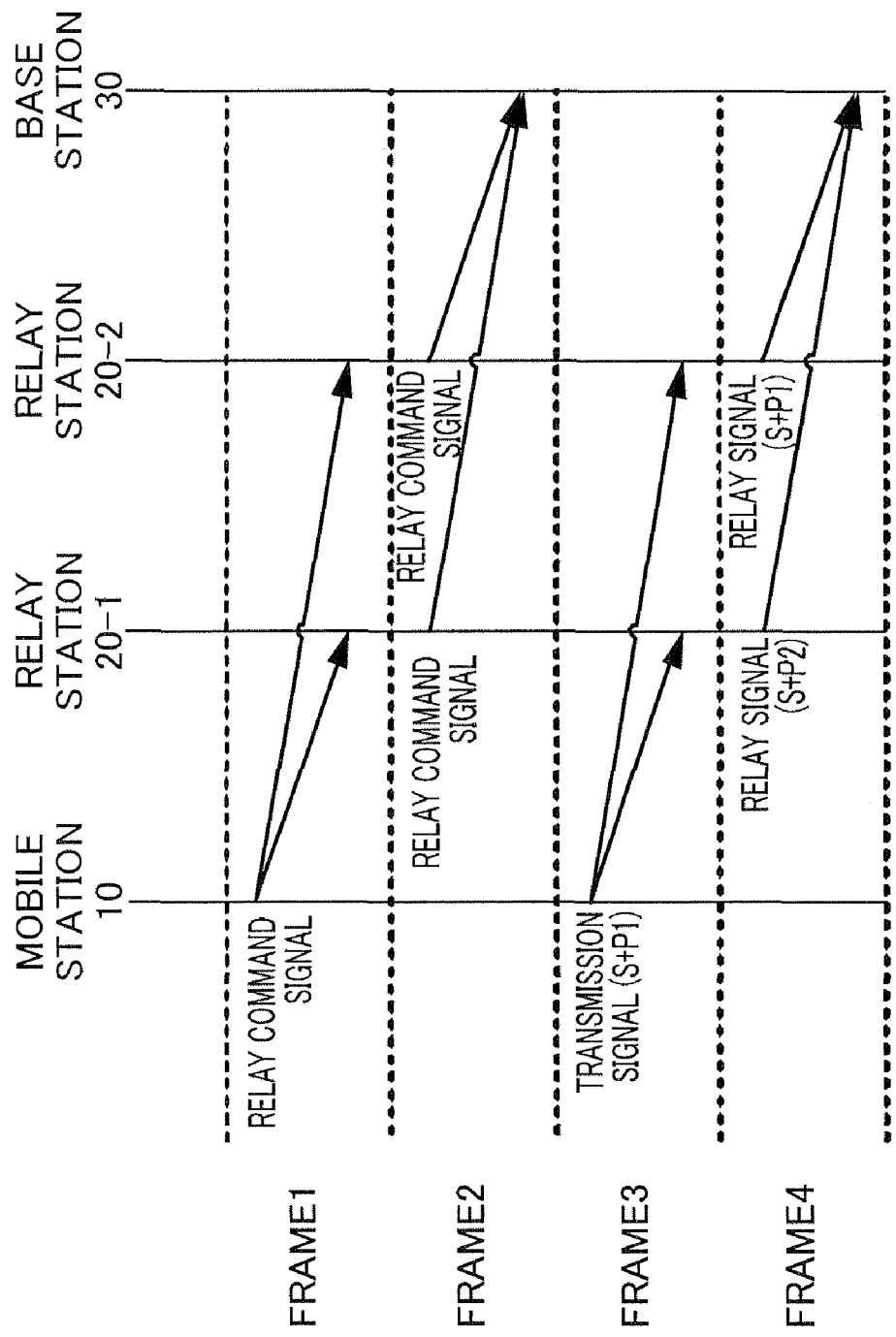
FIG. 9 is an operation sequence diagram of the mobile communication system according to Embodiment 1 of present the invention.

FIG. 9 shows an example of the operation sequence of mobile communication system 1. First, relay commanding section 115 of mobile station 10 determines the details of a relay command signal. In determining the details, table T is referred to, and the details are determined for relay stations 20-1 and 20-2. For example, the details for relay station 20-1 are use of pattern #2 and the details for relay station 20-2 are use of pattern #3. Then, mobile station 10 generates the relay command signal indicating these details. The generated relay command signals are transmitted in frame 1 to relay stations 20-1 and 20-2.

Then, relay stations 20-1 and 20-2 receive the relay command signals from mobile station 10, and transmits the received relay command signals to base station 30 in frame 2.

Further, relay command extracting section 125 of relay station 20-1 refers to the details of the received relay command signal and table T, and specifies the error correction code used in encoding a transmission signal. If transmission this time by mobile station 10 is initial transmission, the specified error correction code is error correction code a.

Meanwhile, relay command extracting section 125 of relay station 20-2 refers to the details of the received relay command signal and table T, and specifies the error correction code used in encoding a transmission signal. If transmission this time by mobile station 10 is initial transmission, the specified error correction code is error correction code e.

Base station 30 receives the relay command signals transmitted from relay stations 20-1 and 20-2. Relay command extracting section 135 of base station 30 refers to the details of the received relay command signal and table T, and specifies the error correction code used in encoding a transmission signal. If transmission this time by mobile station 10 is initial transmission, the specified error correction codes are error correction codes a and e.

Then, mobile station 10 transmits a transmission signal (S+P1) in frame 3. In addition, S is information bits of the transmission signal, and P1 is parity bits added to the information bits S. The parity bits P1 are added to the information bits S by error correction coding processing in coding section 116.

Then, relay stations 20-1 and 20-2 receive the transmission signal (S+P1) from mobile station 10.

Coding section 126 of relay station 20-1 encodes the information bits S of the transmission signal using the error correction code a specified previously. As a result, relay signal (S+P2) is generated. In addition, P2 is different parity bits from P1.

Meanwhile, coding section 126 of relay station 20-2 encodes the information bits S of the transmission signal using the error correction code e specified previously. As a result, relay signal (S+P1) is generated. The information bits S can be obtained by error correction decoding processing in each error correction decoding section 124 of relay stations 20-1 and 20-2.

That is, the command for adding different parity bits to respective relay signals generated in relay stations 20-1 and 20-2 are determined in relay commanding section 115 of mobile station 10, and reported to relay stations 20-1 and 20-2 from mobile station 10.

Relay station 20-1 transmits the generated relay signal (S+P2) to base station 30 in frame 4. Relay station 20-2 transmits the generated relay signal (S+P1) to base station 30 in frame 4.

Then, base station 30 receives the relay signal (S+P1) and the relay signal (S+P2). Error correction decoding section 134 of base station 30 combines the relay signal (S+P1) and the relay signal (S+P2), and generates a combined signal (S+P1+P2) of the relay signals. Then, error correction decoding section 134 decodes the combined signal (S+P1+P2) of the relay signals by using the specified error correction codes a and e.

Figure 10:
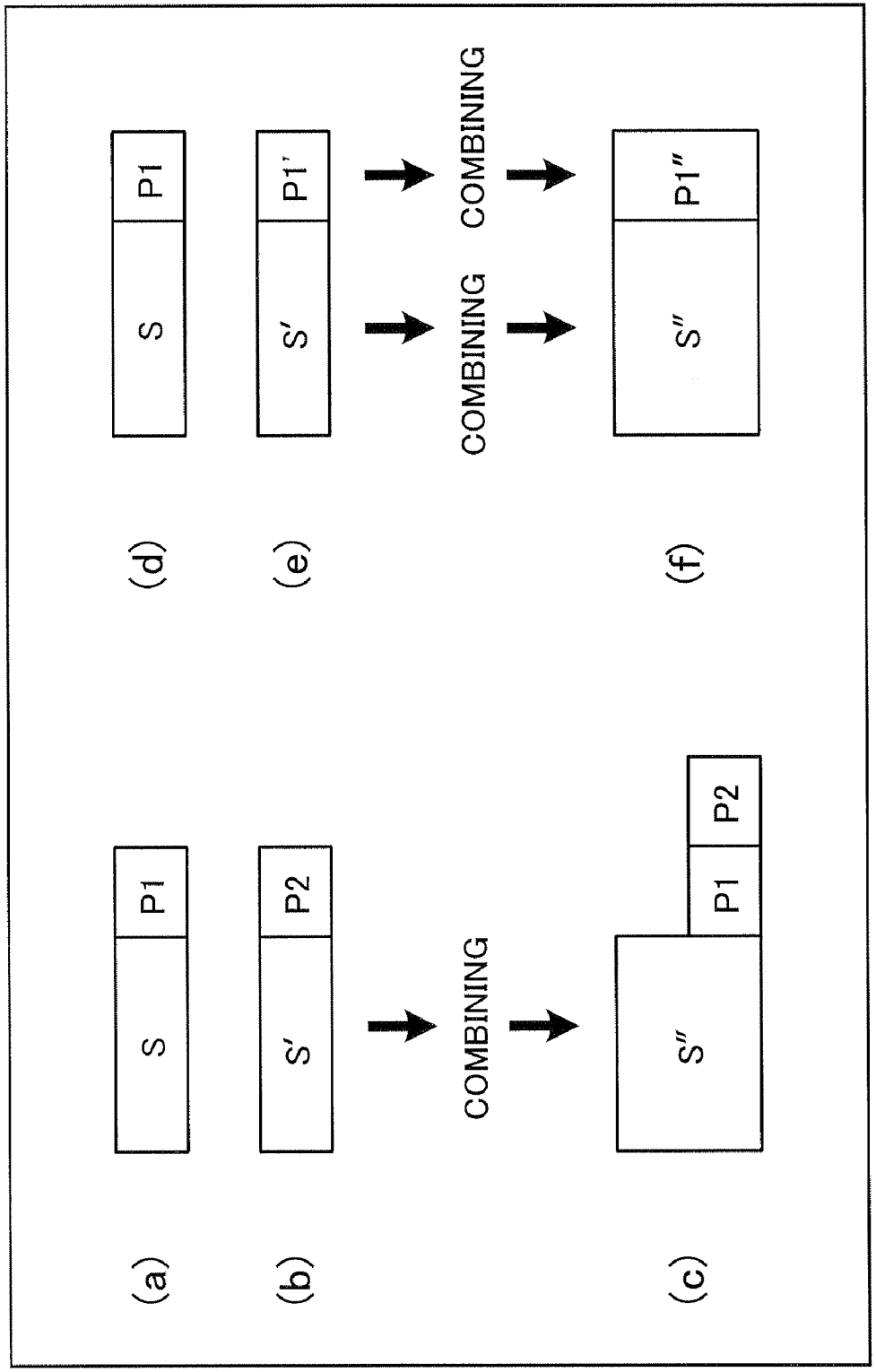
FIG. 10 is a diagram showing combining processing of relay signals according to Embodiment 1 of present the invention.

By thus adding different parity bits to relay signals transmitted from a plurality of relay stations, gain for the error correction codes increases. To more specific, when the signal (S+P1) shown in FIG. 10(a) and the signal (S'+P2) shown in FIG. 10(b) are combined, the signal (S"+P1+P2) shown in FIG. 10(c) is generated (in addition, S, S' and S" are information bits formed with the same sequence having different power). For the signal (S"+P1+P2), not only S" having the power amplified by combining of S and S' is obtained, but also the number of parity bits are increased.

In contrast with this, when the signal (S+P1) shown in FIG. 10(d) and the signal (S'+P1') shown in FIG. 10(e) are combined, the signal (S"+P1") shown in FIG. 10(f) is generated (in addition, P1, P1' and P1" are the same parity bits having different powers respectively). For the signal (S'+P1'), S" having a power amplified by combining of S and S' is obtained, and, in addition, P1" having a power amplified by combining of P and P' is obtained. In addition, the number of parity bits does not increase.

Thus, according to the present embodiment, by carrying out information transmission through relay stations 20-1 and 20-2, it is possible to prevent the cover area of base station 30 from decreasing. Further, according to the present embodiment, a command for adding parity bits P2 to a transmission signal is reported to relay station 20-1 and a command for adding parity bits P1 to a transmission signal is reported to relay station 20-2, so that, by combining the received signals at the receiving side (that is, base station 30), it is possible not only to implement the power amplifying effect but to increase error correction performance, thereby improving error rate characteristics after combining.

In addition, the details of the command determined in relay commanding section 115 of mobile station 10 is not limited to the above.

For example, a command for adding parity bits PA having the specific length to a transmission signal may be determined and reported to relay station 20-1. Further, the command for adding parity bits PB having the length different from the length of parity bits PA to a transmission signal may be determined and reported to relay station 20-2. Further, when the reception quality of the signal received from relay station 20-1 at base station 30 is better than the reception quality of the signal received in base station 30 from relay station 20-2, relay commanding section 115 may set the length of parity bits PA shorter than the length of parity bits PB.

Alternately, the command for generating a relay signal RS1 which is formed with information bits and parity bits and has a specific value of rate of the information bits may be determined and reported to relay station 20-1. Further, a command for generating a relay signal RS2 which is formed with information bits and parity bits and has the information bits rate different from RS1 may be determined and reported to relay station 20-2. Further, when the reception quality of the signal received from relay station 20-1 at base station 30 is better than the reception quality of the signal received from relay station 20-2 at base station 30, relay commanding section 115 may set the rate of the information bits in the relay signal RS1 higher than the rate of the information bits in the relay signal RS2.

Further, a command for generating a relay signal RS1 formed with one of information bits and parity bits may be determined and reported to relay station 20-1. Further, a command for generating a relay signal RS2 formed with the other one of information bits and parity bits may be determined and reported to relay station 20-2. Furthermore, when the reception quality of the signal received from relay station 20-1 at base station 30 is better than the reception quality of the signal received from relay station 20-2 at base station 30, relay commanding section 115 may report the command for generating the relay signal RS1 formed with only information bits to relay station 20-1, and report the command for generating the relay signal RS2 formed with only parity bits to relay station 20-2.

In cases where the above alternatives are employed, the information bits can be relayed by a relay station having the higher reception quality.

Further, although, in the present embodiment, the relay command signal is generated and transmitted by mobile station 10, base station 30, relay station 20 or an upper control station may generate and transmit the relay command signal.

Furthermore, although, in the present embodiment, the above advantage is implemented in information transmission on uplink by providing the radio transmitting apparatus in mobile station 10, it is possible to implement the above advantage in information transmission on downlink by providing the radio transmitting apparatus in base station 30. Furthermore, the radio transmitting apparatus according to the present embodiment can be applied to relay station 20.

Embodiment 2

Figure 11:
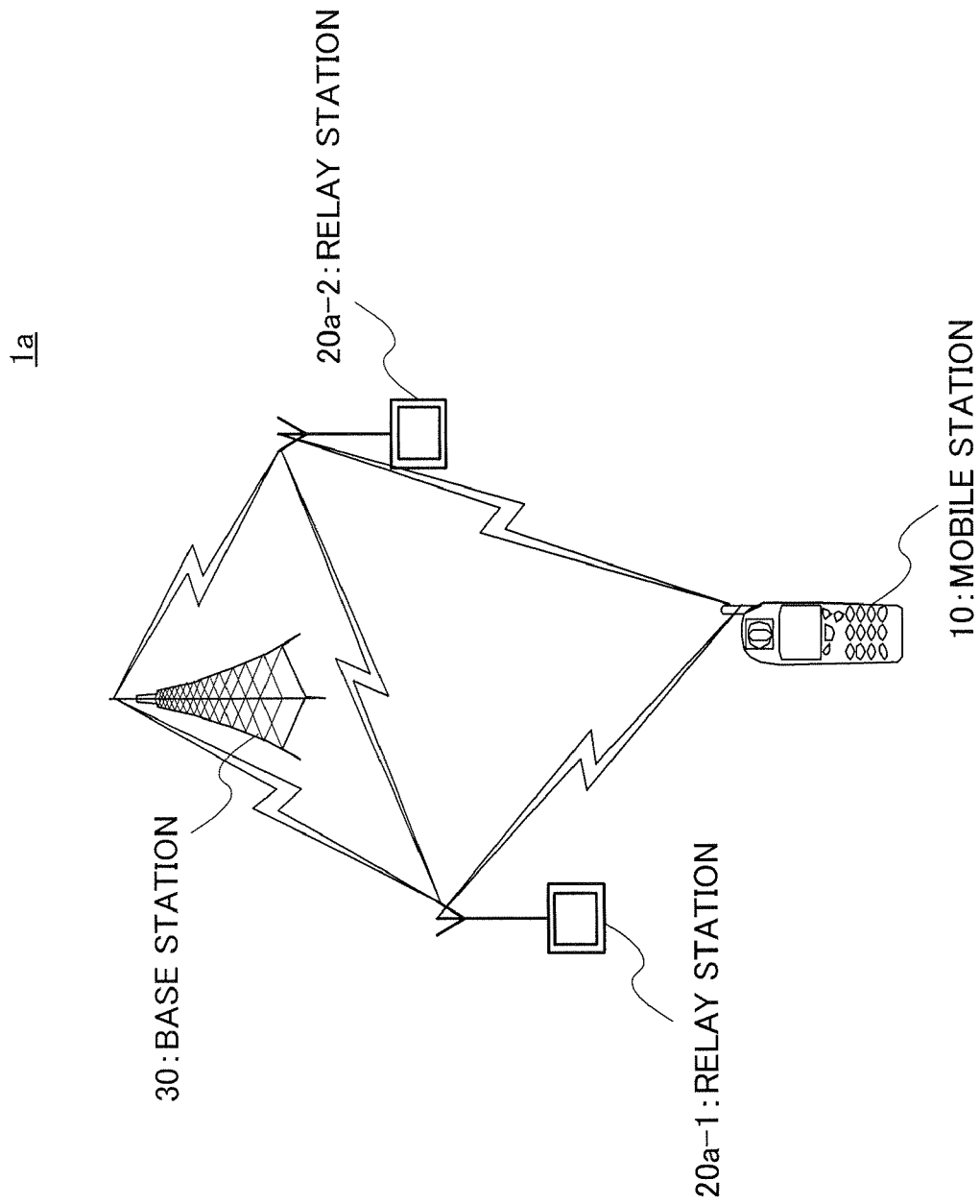
FIG. 11 shows a configuration of a mobile communication system according to Embodiment 2 of the present invention.

FIG. 11 shows a configuration of a mobile communication system according to Embodiment 2 of the present invention. Mobile communication system 1a of FIG. 11 has relay stations 20a-1 and 20a-2, in addition to mobile station 10 and base station 30 described in Embodiment 1.

In addition, relay stations 20a-1 and 20a-2 have the same internal configuration. In the following description, either one of relay stations 20-1 and 20-2 will be referred to as "relay station 20a." Further, relay station 20a has the same internal configuration as relay station 20 described in Embodiment 1. Accordingly, the same components as those described in Embodiment 1 are assigned the same reference numerals and will not be described in detail.

Moreover, in the present embodiment, although the number of relay stations is two for convenience, but the number of relay stations may be one or three or more. There may be a case where a transmission signal is transmitted through only a single relay station depending on communication conditions. However, to implement the present invention, a transmission signal is preferably transmitted through two or more relay stations.

The configuration of mobile station 10 of the present embodiment is the same as that described in Embodiment 1, and a block diagram and detailed description thereof are omitted. In mobile station 10 of the present embodiment, the following details are added to the command determined in relay commanding section 115. The added details include generating the relay signal which is given parity bits different from parity bits added to the transmission signal.

Figure 12:
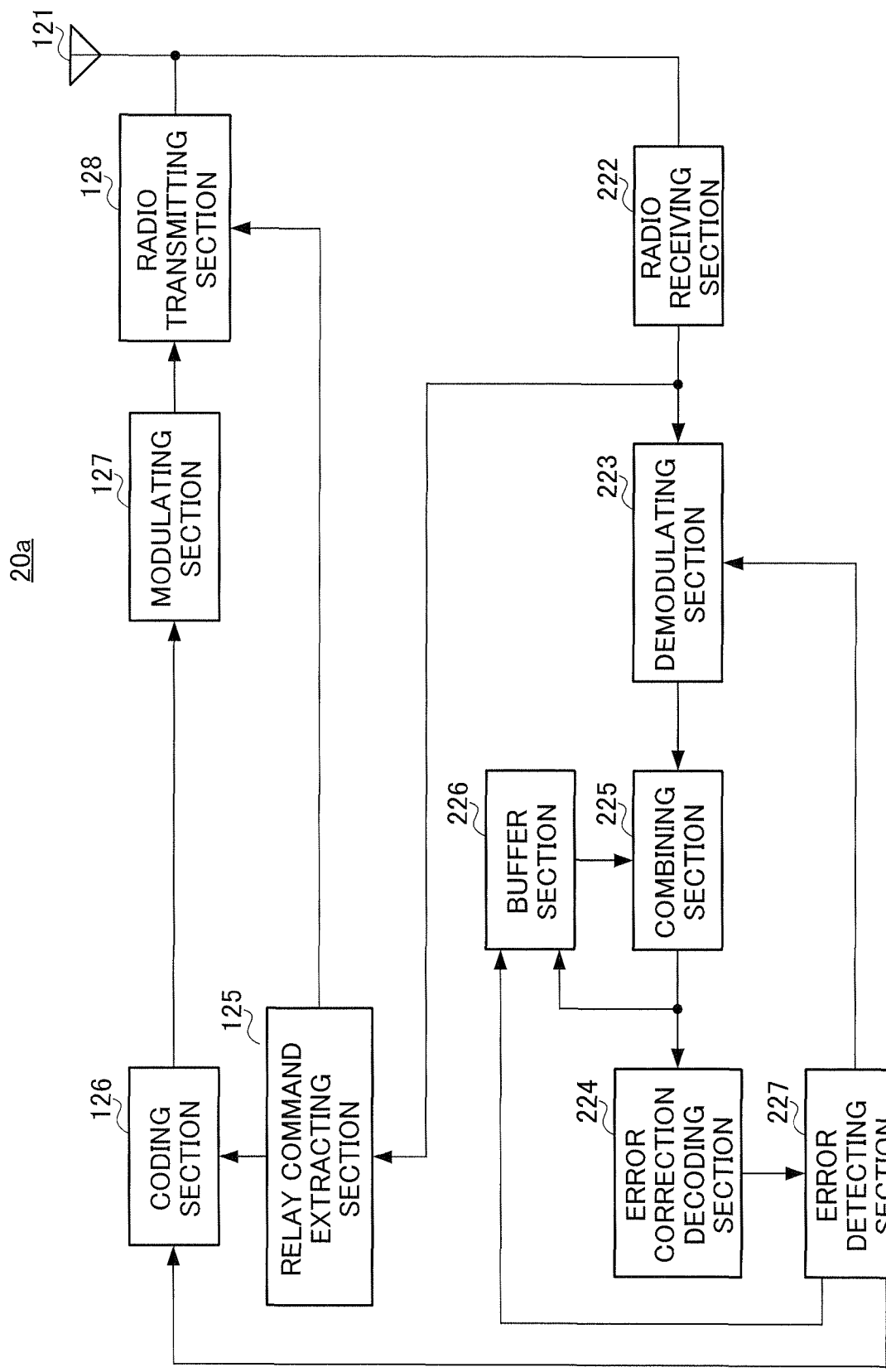
FIG. 12 is a block diagram showing a configuration of a relay station apparatus according to Embodiment 2 of the present invention.

As shown in FIG. 12, relay station 20a has, in addition to antenna 121, relay commanding section 125, coding section 126, modulating section 127 and radio transmitting section 128 as described in Embodiment 1, radio receiving section 222, demodulating section 223, error correction decoding section 224, combining section 225, buffer section 226 and error detecting section 227.

Radio receiving section 222 receives the transmission signal or relay command signal transmitted from mobile station 10 through antenna 121. Then, radio receiving section 222 carries out predetermined radio receiving processing (for example, down-conversion and A/D conversion) on the received transmission signal (received signal) or relay command signal. The received signal or relay command signal subjected to the radio receiving processing is outputted to demodulating section 223 and relay command extracting section 125.

Further, radio receiving section 222 receives the relay signal transmitted from another relay station 20a through antenna 121. Then, radio receiving section 222 carries out predetermined radio receiving processing on the received relay signal. The relay signal subjected to the radio receiving processing is outputted to demodulating section 223.

Demodulating section 223 demodulates the received signal out of the signals inputted from radio receiving section 222. According to the command from error detecting section 227, when radio receiving section 222 can reliably receive the relay signal transmitted from another relay station 20a, demodulating section 223 demodulates the relay signal.

Combining section 225 stores the received signal demodulated by demodulating section 223 in buffer section 226, and outputs the received signal to error correction decoding section 224. Further, combining section 225 combines the relay signal demodulated by demodulating section 223 and the signal (buffer signal) stored in buffer section 226. Then, combining section 225 stores the combined signal in buffer section 226 in place of the signal before combining, and outputs the combined signal to error correction decoding section 224.

Buffer section 226 stores the signal obtained in combining section 225. Further, the stored signal is deleted when an error is not detected in error detecting by error detecting section 227.

Error correction decoding section 224 carries out error correction decoding processing on the signal inputted from combining section 225. The signal subjected to the error correction decoding processing in error correction decoding section 224 is outputted to error detecting section 227.

Error detecting section 227 carries out error detecting on the signal subjected to error correction decoding by error correction decoding section 224. In the present embodiment, error detecting section 227 carries out error detecting using CRC (Cyclic Redundancy Check). However, the available error detecting method is not limited to only CRC, and may use, for example, vertical parity check, horizontal parity check and hamming code instead.

When an error is detected (CRC: NG) as a result of error detecting and then the relay signal transmitted from another relay station 20a can be reliably received, error detecting section 227 commands demodulation of the relay signal to demodulating section 223. When an error is not detected (CRC: Good) as a result of error detecting, error detecting section 227 outputs the signal subjected to error correction decoding to coding section 126 and discards the signal stored in buffer section 226.

Figure 13:
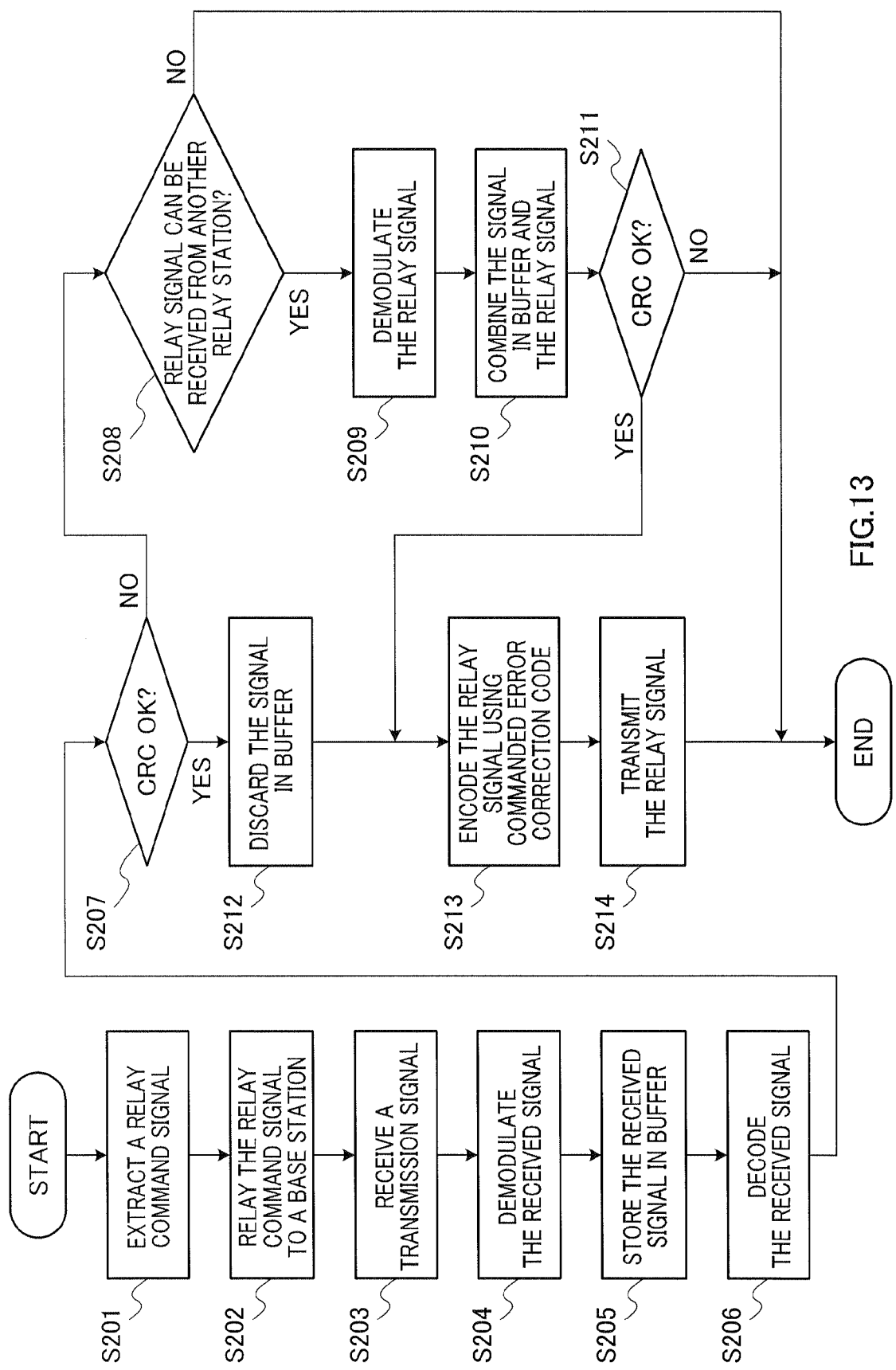
FIG. 13 is a flow diagram showing operation of the relay station apparatus according to Embodiment 2 of the present invention.

Relay station 20a having the above configuration operates according to the flow shown in FIG. 13 as an example.

First, relay command extracting section 125 extracts a relay command signal out of the output signals of radio receiving section 222 (S201). At this point, relay command extracting section 125 refers to the details indicated in the relay command signal, and specifies the error correction code used in error correction coding processing.

Then, the extracted relay command signal is relayed to base station 30 (S202). That is, the extracted relay command signal is outputted to radio transmitting section 128, and transmitted from radio transmitting section 128 to base station 30 through antenna 121.

Then, the transmission signal transmitted from mobile station 10 is received in radio receiving section 222 (S203). The signal is demodulated in demodulating section 223 as a received signal. The demodulated received signal is stored in buffer section 226 (S205), and is decoded in error correction decoding section 224 (S206).

The demodulated received signal is subjected to error detecting processing in error detecting section 227. When an error is detected (S207: NO), error detecting section 227 outputs a command to demodulating section 223. According to this command, when the relay signal transmitted from another relay station 20a can be reliably received (S208: YES), demodulating section 223 demodulates the relay signal (S209). Meanwhile, when the relay signal transmitted from another relay station 20a cannot be reliably received (S208: NO), relay processing ends.

Subsequent to the demodulation processing in step S209, combining section 225 combines the signal stored in buffer section 226 and the relay signal demodulated in step S209 (S210). The combined signal is decoded in error correction decoding section 224.

The decoded combined signal is subjected to error detecting processing in error detecting section 227. When an error is not detected (S211: YES), the flow proceeds to step S213 described later. When an error is detected (S211: NO), relay processing ends.

Further, in error detecting in step S207, when an error is not detected (S207: YES), the signal stored in buffer section 226 is discarded (S212).

Then, in step S213, coding section 126 encodes the signal inputted from error detecting section 227. The error correction code specified in step S201 is used in encoding the input signal. The encoded signal is outputted to modulating section 127 as a relay signal. The relay signal is modulated, outputted to radio transmitting section 128, and transmitted to base station 30 from radio transmitting section 128 (S214).

Next, an example of operation in entire mobile communication system 1a will be described.

Herein, a case will be described as a example where an error detecting result of the transmission signal received by relay station 20a-1 is OK, and an error detecting result of the transmission signal received by relay station 20a-2 is NG.

Figure 14:
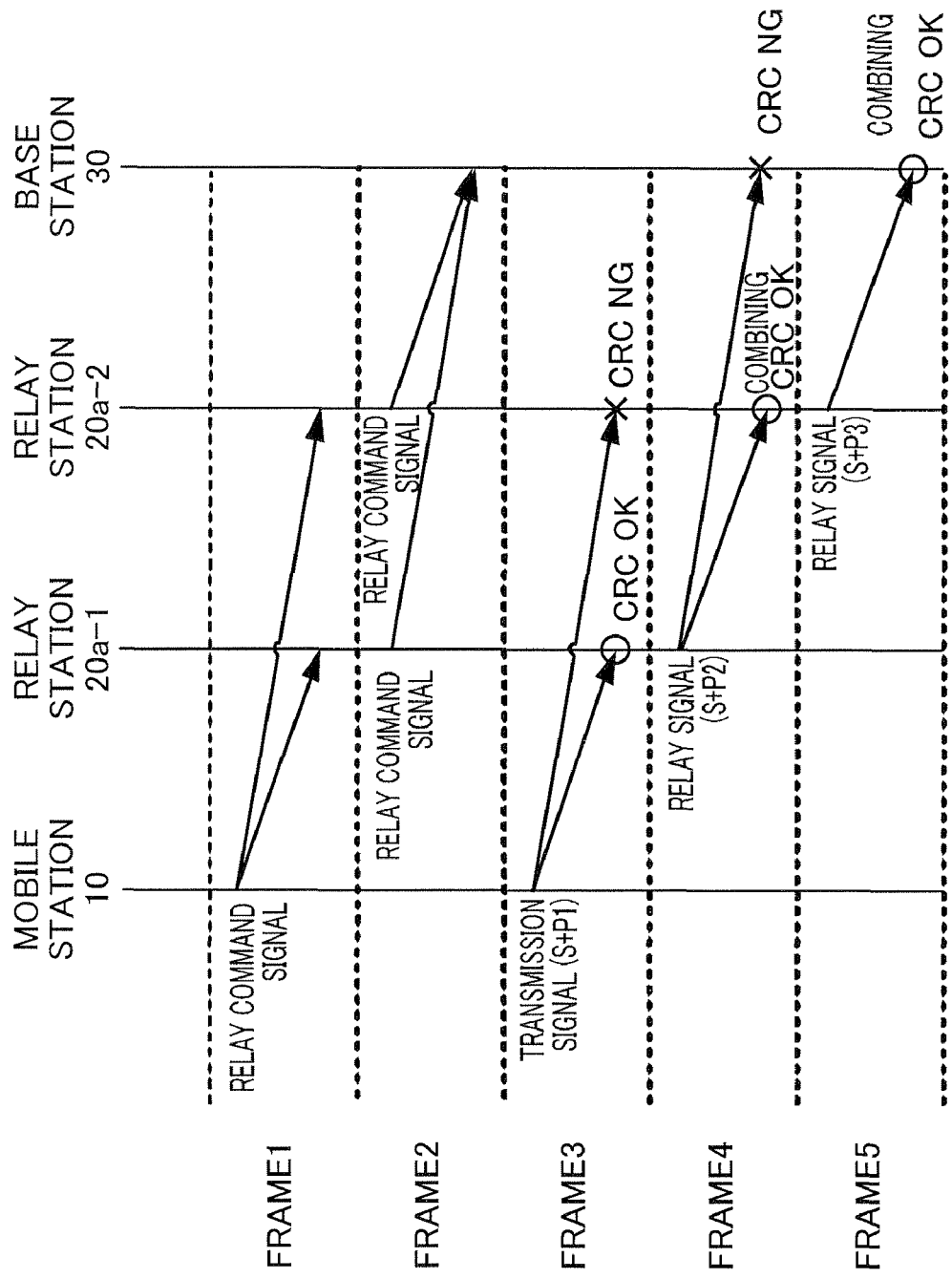
FIG. 14 is an operation sequence diagram of the mobile communication system according to Embodiment 2 of the present invention.

FIG. 14 shows an example of the operation sequence of mobile communication system 1a. First, in frame 1, mobile station 10 transmits a relay command signal to relay stations 20a-1 and 20a-2. Then, in frame 2, relay stations 20a-1 and 20a-2 transmit the relay command signals to base station 30. The detailed operation in frames 1 and 2 is as described in Embodiment 1 except the command.

In frame 3, mobile station 10 transmits a transmission signal (S+P1) to relay stations 20a-1 and 20a-2.

Then, relay stations 20a-1 and 20a-2 receive the transmission signal (S+P1).

Each error detecting section 227 of relay stations 20a-1 and 20a-2 carries out error detecting on the decoded received signal (that is, the transmission signal (S+P1) subjected to error correction decoding processing). In this example, an error is not detected in relay station 20a-1 (CRC: OK), and an error is detected in relay station 20a-2 (CRC: NG).

Accordingly, information bits S of the transmission signal received by relay station 20*a*-1 are encoded, and transmitted as a relay signal (S+P2) in frame 4. Meanwhile, the information bits S of the transmission signal received by relay station 20*a*-2 are neither encoded nor transmitted in frame 4.

In frame 4, relay station 20*a*-2 receives the relay signal (S+P2) transmitted from relay station 20*a*-1. Then, relay station 20*a*-2 combines the received relay signal (S+P2) and the transmission signal (S+P1) received in frame 3. Error detecting section 227 of relay station 20*a*-2 carries out error detecting on the combined signal subjected to error correction decoding processing. In this example, an error is not detected in the combined signal (CRC: OK).

Accordingly, the information bits S of the combined signal are encoded, and transmitted as a relay signal (S+P3) in frame 5. In addition, P3 is parity bits different from P1 or P2.

Even when base station 30 cannot correctly receive the relay signal (S+P2) received from relay station 20*a*-1 in frame 4 (CRC: NG), by combining the relay signal (S+P2) and the relay signal (S+P3) received from relay station 20*a*-2 in frame 5, it is possible to correct the error in the received signal.

Thus, according to the present embodiment, the command for generating a relay signal which is given parity bits P2 or P3 different from parity bits P1 in the transmission signal transmitted from mobile station 10 is determined and is reported to relay station 20*a*-1 or 20*a*-2, so that the relay signal which is given parity bits P2 or P3 different from parity bits P1 is generated in relay station 20*a*-1 or 20*a*-2, respectively. Therefore, when one of relay stations 20*a*-1 and 20*a*-2 cannot correctly receive the transmission signal of mobile station 10, the relay signal transmitted from another relay station can be reliably received. Accordingly, it is possible to combine the transmission signal and relay signal, so that it is possible to implement the error correction effect in relay stations 20*a*-1 and 20*a*-2, and to improve the error correction effect in the entire system.

Further, although, in the present embodiment, the relay command signal is generated and transmitted in mobile station 10, the relay command signal may be generated and transmitted in relay station 20*a*. Furthermore, the radio transmitting apparatus according to the present embodiment can be applied to relay station 20*a*.

Embodiment 3

Figure 15:
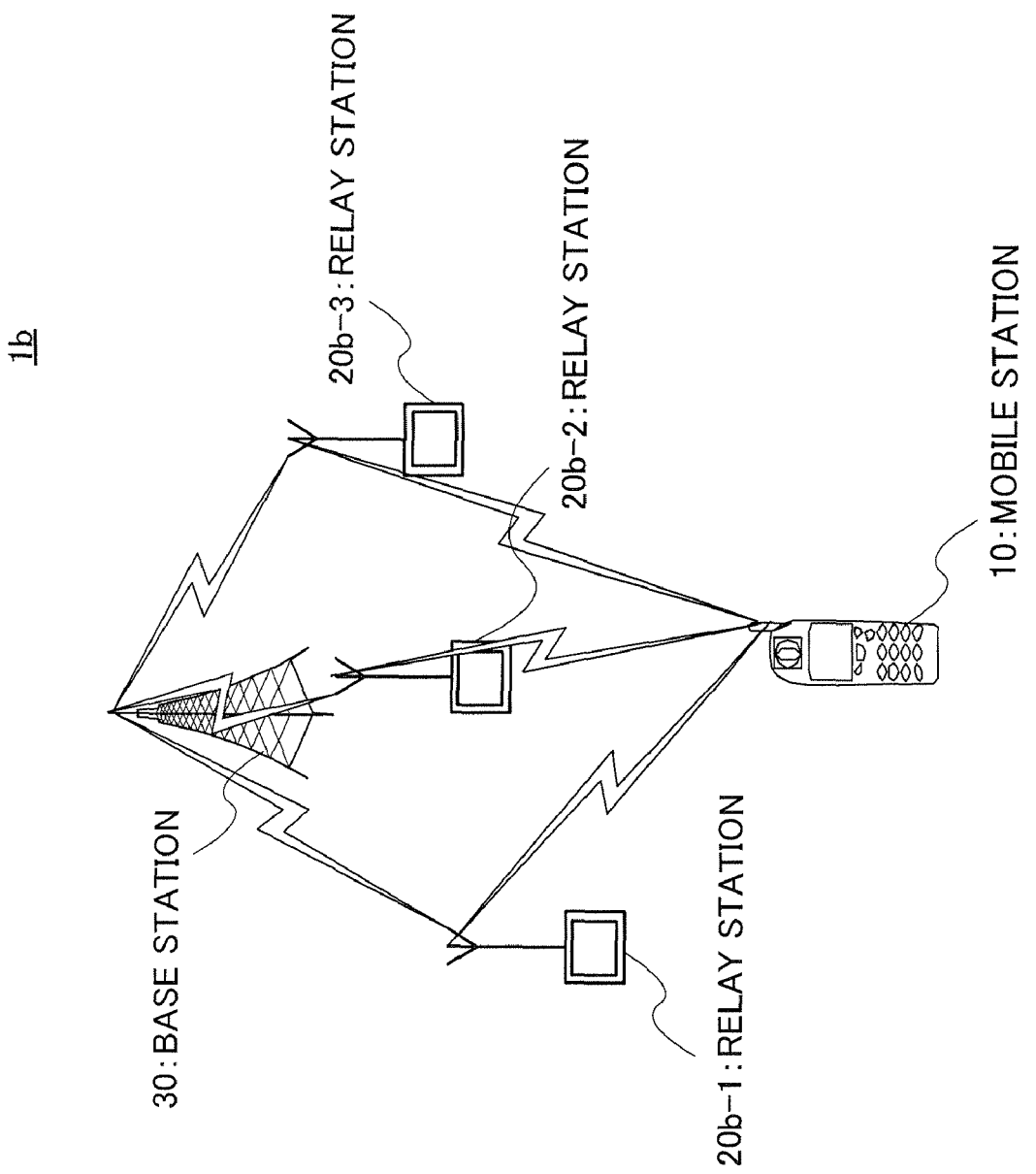
FIG. 15 shows a configuration of a mobile communication system according to Embodiment 3 of the present invention.

FIG. 15 shows a configuration of a mobile communication system according to Embodiment 3 of the present invention. Mobile communication system 1*b* of FIG. 15 has, in addition to mobile station 10 and base station 30 described in Embodiment 1, relay stations 20*b*-1, 20*b*-2 and 20*b*-3.

In addition, relay stations 20*b*-1, 20*b*-2 and 20*b*-3 have the same internal configuration. In the following description, either one of relay stations 20*b*-1, 20*b*-2 and 20*b*-3 will be referred to as "relay station 20*b*." Further, relay station 20*b* has the same internal configuration as relay station 20 as described in Embodiment 1. Accordingly, the same components as those described in Embodiment 1 are assigned the same reference numerals and will not be described in detail.

Moreover, in the present embodiment, although the number of relay stations is three for convenience, the number of relay stations may be one, two or four or more. There may be a case where a transmission signal is transmitted through a single relay station depending on communication conditions, to implement the present invention, a transmission signal is preferably transmitted through two or more relay stations.

Further, although, in the present embodiment, mobile station 10 described in Embodiment 1 is used, a conventional mobile station may be alternately used.

Figure 16:
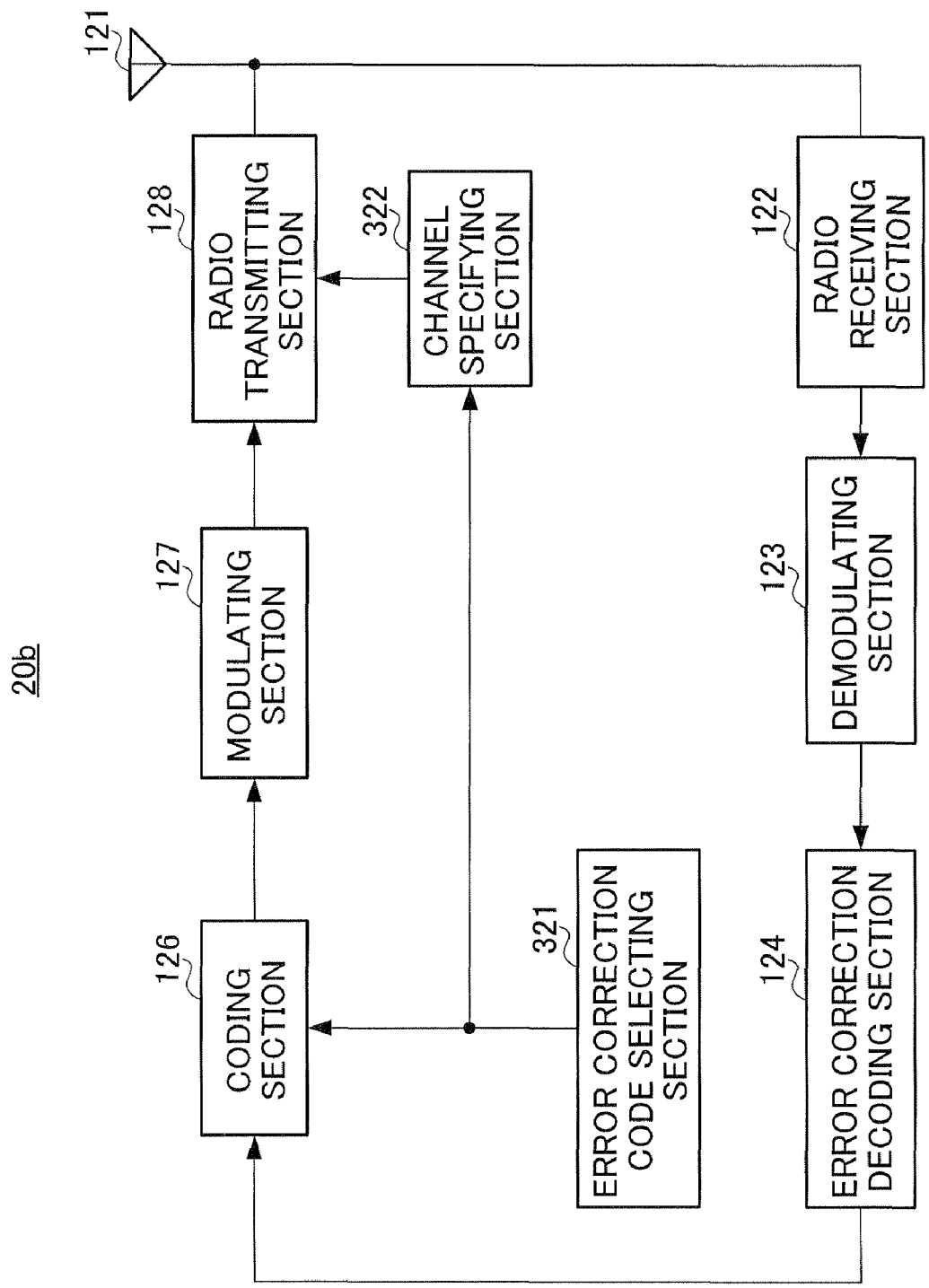
FIG. 16 is a block diagram showing a configuration of a relay station apparatus according to Embodiment 3 of the present invention.

As shown in FIG. 16, relay station 20*b* has, in addition to antenna 121, radio receiving section 122, demodulating section 123, error correction decoding section 124, coding section 126, modulating section 127 and radio transmitting section 128 described in Embodiment 1, error correction code selecting section 321 and channel specifying section 322.

Error correction code selecting section 321 randomly selects one of a plurality of error correction codes prepared in advance. The selected error correction code is reported to coding section 126 and channel specifying section 322. In addition, error correction code selecting section 321 may have, for example, table T described in Embodiment 1. In this case, error correction code selecting section 321 can select the error correction code according to the pattern listed in table T.

Channel specifying section 322 specifies a channel corresponding to the error correction code reported from error correction code selecting section 321 out of a plurality of channels. Then, channel specifying section 322 specifies use of the specified channel to radio transmitting section 128. Accordingly, in the present embodiment, radio transmitting section 128 transmits a relay signal using the channel specified by channel specifying section 322. In this case, relay command extracting section 135 of base station 30 specifies the error correction code used in error correction decoding processing based on the channel used in transmitting the relay signal.

Figure 17:
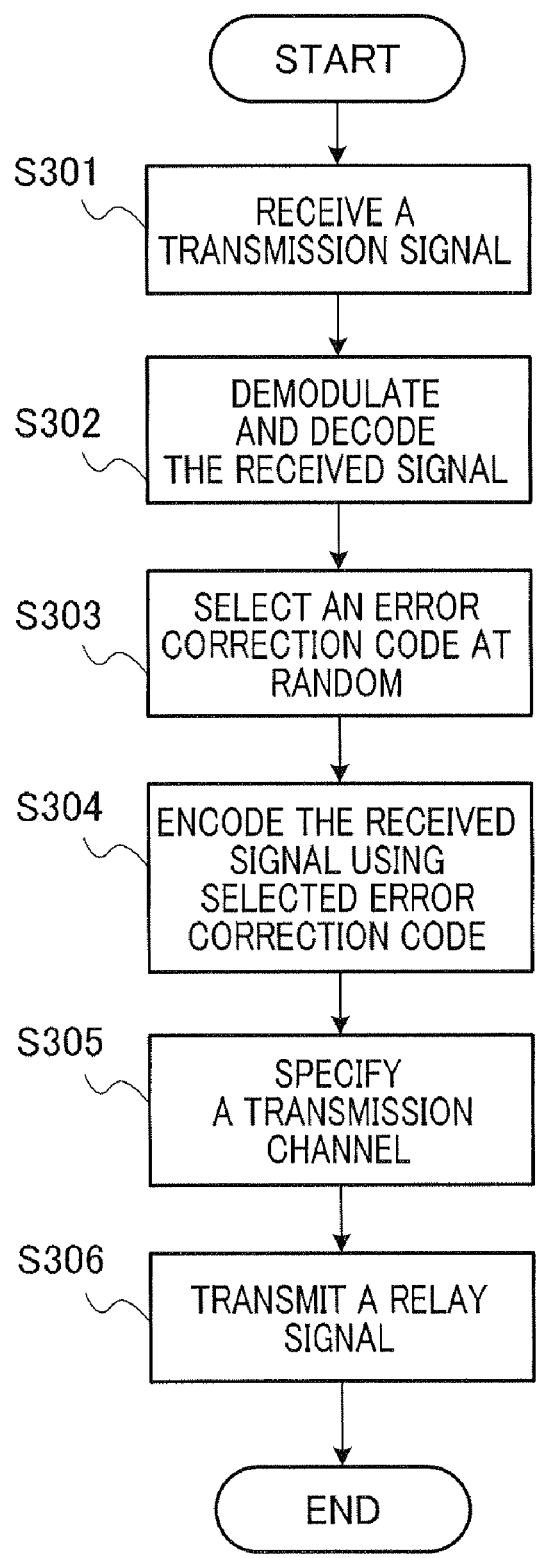
FIG. 17 is a flow diagram showing operation of the relay station apparatus according to Embodiment 3 of the present invention.

Relay station 20*b* having the above configuration operates according to the flow shown in FIG. 17 as an example. First, the transmission signal transmitted from mobile station 10 is received in radio receiving section 122 (S301). The transmission signal is demodulated in demodulating section 123 as a received signal, decoded in error correction decoding section 124 and outputted to coding section 126 (S302).

Then, error correction code selecting section 321 randomly selects one out of a plurality of error correction codes prepared in advance, for example, error correction codes a to h (S303).

Coding section 126 encodes the received signal using the error correction code selected in step S303 (S304). The encoded received signal is outputted to modulating section 127 as a relay signal. The relay signal is modulated in modulating section 127, and outputted to radio transmitting section 128.

Further, channel specifying section 322 specifies the transmission channel based on the error correction code selected in step S303 (S305). To be more specific, channel specifying section 322 uses, for example, the table indicating a correspondence between the error correction code and the channel shown in FIG. 18. For example, when error correction code a is selected, channel 1 is specified as a channel for use in transmission out of channels 1 to 8. In addition, channels 1 to 8 are subcarriers in an OFDM (Orthogonal Frequency Division Multiplexing) scheme, frequency bands in an FDMA (Frequency Division Multiple Access) scheme, spreading codes in a CDMA (Code Division Multiple Access) scheme or time zones in a TDMA (Time Division Multiple Access) scheme, or may be combinations thereof. Further, the table is provided also in relay command extracting section 135 of base station 30.

Then, radio transmitting section 128 transmits the modulated relay signal using the channel specified in step S305 (S306).

Figure 19:
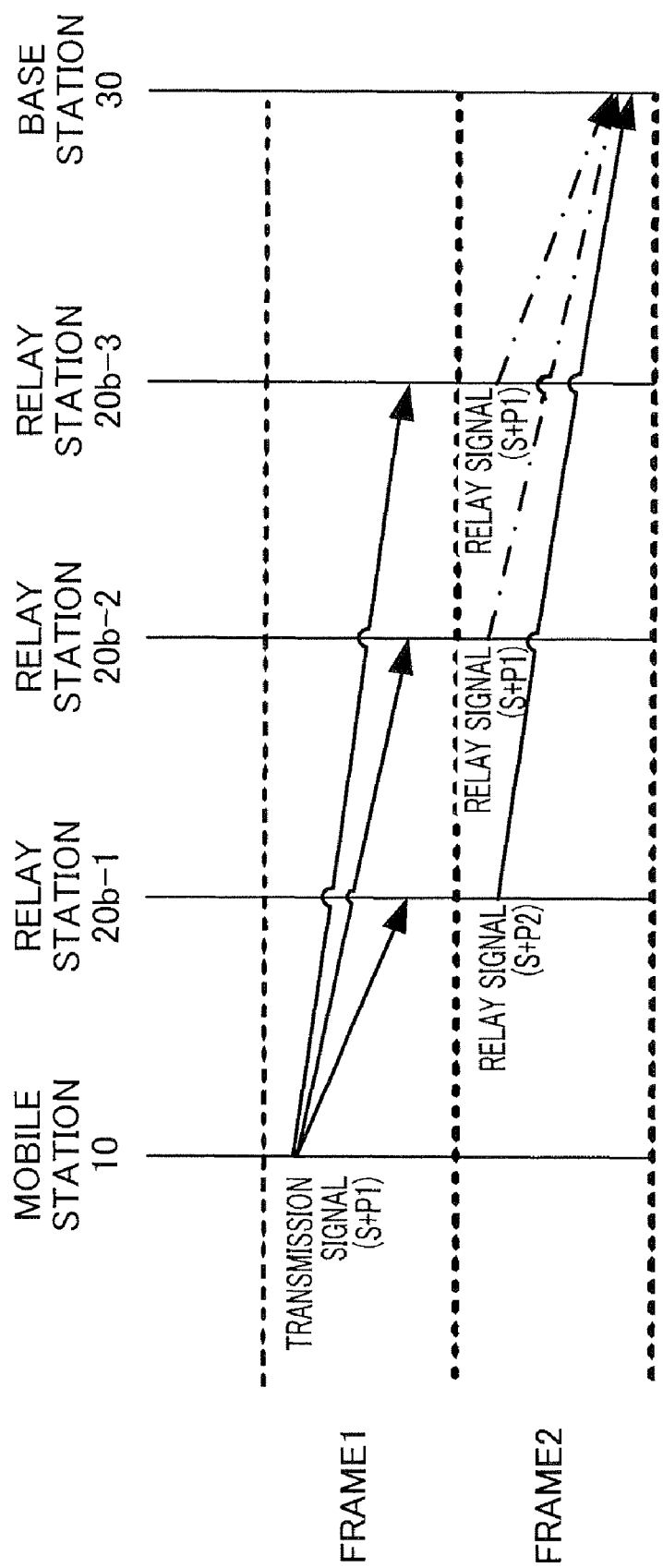
FIG. 19 is an operation sequence diagram of the mobile communication system according to Embodiment 3 of the present invention.

Next, an example of operation will be described in entire mobile communication system 1b. FIG. 19 shows an example of the operation sequence of mobile communication system 1b.

First, in frame 1, mobile station 10 transmits a transmission signal (S+P1) to relay stations 20b-1 to 20b-3.

Relay stations 20b-1 to 20b-3 each randomly select error correction codes, and encode the transmission signals (S+P1) using the selected error correction codes. For example, error correction code selecting section 321 of relay station 20b-1 selects error correction code b. Further, coding section 126 of relay station 20b-1 adds parity bits P2 to information bits S according to the error correction code b. Further, error correction code selecting section 321 of relay station 20b-2 selects error correction code a. Moreover, coding section 126 of relay station 20b-2 adds parity bits P1 to the information bits S according to error correction code a. Furthermore, error correction code selecting section 321 of relay station 20b-3 selects error correction code a. Moreover, coding section 126 of relay station 20b-3 adds parity bits P1 to the information bits S according to error correction code a.

Then, in frame 2, relay station 20b-1 transmits a relay signal (S+P2) using channel 2 corresponding to error correction code b. Relay stations 20b-2 and 20b-3 transmit relay signals (S+P1) using channel 1 corresponding to error correction code a. Base station 30 combines the relay signals respectively transmitted from relay stations 20b-1 to 20b-3, and decodes the combined relay signal.

Thus, according to the present embodiment, relay signals are transmitted using channels corresponding to the error correction codes selected in relay stations 20b-1 to 20b-3, so that it is possible to implement the same advantage as described in Embodiments 1 and 2, without using the relay command signals as described in Embodiments 1 and 2.

In addition, a configuration may be employed where signaling of the selected error correction codes carried out from relay stations 20b-1 to 20b-3 to base station 30. Also in this case, mobile station 10 does not need to transmit the relay command signal before transmitting a transmission signal.

Further, the radio transmitting apparatus according to the present embodiment can be applied to relay station 20b.

Furthermore, although error correction code selecting section 321 of relay station 20b according to the present embodiment selects the error correction code without depending on the details of the relay command signal transmitted from mobile station 10, error correction code selecting section 321 may receive as input the relay command signal received in radio receiving section 122 of relay station 20b, and may select the error correction code according to the details of the relay command signal.

In this case, the command determined in relay commanding section 115 of mobile station 10, may be a selecting method of an error correction code, for example. An option of the selecting method is random selection as described in the present embodiment, for example. Further, another option is pattern selection using table T as described in Embodiment 1, for example. Furthermore, a plurality of random selection methods may be prepared, and mobile station 10 may specify one of the random selection methods. Moreover, a plurality of tables where a plurality of patterns are listed may be prepared, and mobile station 10 may specify use of one of the tables. Moreover, in a condition where it is necessary to control the error correction code selected in relay station 20b, mobile station 10 may report to relay station 20b that random selection is not allowed. Meanwhile, in a condition where it is not necessary to control the error correction code selected in relay station 20b, mobile station 10 may report to relay station 20b that random selection is allowed.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2005-022898, filed on Jan. 31, 2005, the entire content of which is expressly incorporated by reference herein.

INDUSTRIAL APPLICABILITY

A radio transmitting apparatus and radio transmitting method of the present invention can be applied to, for example, a base station apparatus, mobile station apparatus and relay station apparatus used in a wireless communication system such as a cellular mobile communication system.

The invention claimed is:

1. A wireless transmission apparatus comprising:
a transmitting section that transmits a transmission signal for a communicating party apparatus, to a plurality of relay station apparatuses, each of the plurality of relay station apparatuses generating a relay signal from the transmission signal and transmitting the generated relay signal to the communicating party apparatus;
a determining section that outputs a first command to generate a first relay signal from the transmission signal and a second command to generate a second relay signal from the transmission signal, the second relay signal being different from the first relay signal and combinable with the first relay signal at the communicating party apparatus that receives the first relay signal and the second relay signal; and
a reporting section that reports the first command to a first relay station apparatus from among the plurality of relay station apparatuses, and reports the second command to a second relay station apparatus, different from the first relay station apparatus, from among the plurality of relay station apparatuses, wherein:
the first command comprises a command to add first parity bits to the transmission signal in the first relay station apparatus, and the second command comprises a command to add second parity bits, different from the first parity bits, to the transmission signal in the second relay station apparatus.

2. The wireless transmission apparatus according to claim 1, wherein the first command comprises a command to add first parity bits to the transmission signal in the first relay station apparatus, and the second command comprises a command to add second parity bits having a length different from a length of the first parity bits, to the transmission signal in the second relay station apparatus.

3. The wireless transmission apparatus according to claim 2, further comprising:
an acquiring section that acquires a first reception quality of a signal received by the communicating party apparatus from the first relay station apparatus and a second reception quality of a signal received by the communicating party apparatus from the second relay station apparatus, wherein:
when the first reception quality is better than the second reception quality, the determining section sets the length of the first parity bits shorter than the length of the second parity bits.

4. A mobile station apparatus having the wireless transmission apparatus according to claim 1.

5. A base station apparatus having the wireless transmission apparatus according to claim 1.

6. A relay station apparatus having the wireless transmission apparatus according to claim 1.

7. A wireless transmission apparatus comprising:
a transmitting section that transmits a transmission signal for a communicating party apparatus, to a plurality of relay station apparatuses, each of the plurality of relay station apparatuses generating a relay signal from the transmission signal and transmitting the generated relay signal to the communicating party apparatus;
a determining section that outputs a first command to generate a first relay signal from the transmission signal and a second command to generate a second relay signal from the transmission signal, the second relay signal being different from the first relay signal and combinable with the first relay signal at the communicating party apparatus that receives the first relay signal and the second relay signal; and
a reporting section that reports the first command to a first relay station apparatus from among the plurality of relay station apparatuses, and reports the second command to a second relay station apparatus, different from the first relay station apparatus, from among the plurality of relay station apparatuses, wherein:
the first command comprises a command to generate, from the transmission signal, the first relay signal comprising information bits and parity bits, and the second command comprises a command to generate, from the transmission signal, the second relay signal comprising information bits and parity bits with an information bit rate of the second relay signal being different from that of the first relay signal.

8. The wireless transmission apparatus according to claim 7, further comprising:
an acquiring section that acquires a first reception quality of a signal received by the communicating party apparatus from the first relay station apparatus and a second reception quality of a signal received by the communicating party apparatus from the second relay station apparatus, wherein:
when the first reception quality is better than the second reception quality, the determining section sets the information bit rate in the first relay signal higher than that in the second relay signal.

9. A wireless transmission apparatus comprising:
a transmitting section that transmits a transmission signal for a communicating party apparatus, to a plurality of relay station apparatuses, each of the plurality of relay station apparatuses generating a relay signal from the transmission signal and transmitting the generated relay signal to the communicating party apparatus;
a determining section that outputs a first command to generate a first relay signal from the transmission signal and a second command to generate a second relay signal from the transmission signal, the second relay signal being different from the first relay signal and combinable with the first relay signal at the communicating party apparatus that receives the first relay signal and the second relay signal; and
a reporting section that reports the first command to a first relay station apparatus from among the plurality of relay station apparatuses, and reports the second command to a second relay station apparatus, different from the first relay station apparatus, from among the plurality of relay station apparatuses, wherein
the first command comprises a command to generate, from the transmission signal, the first relay signal comprising one of the group of information bits and parity bits, and the second command comprises a command to generate, from the transmission signal, the second relay signal comprising the other one of the group of information bits and parity bits.

10. The wireless transmission apparatus according to claim 9, further comprising:
an acquiring section that acquires a first reception quality of a signal received by the communicating party apparatus from the first relay station apparatus and a second reception quality of a signal received by the communicating party apparatus from the second relay station apparatus, wherein:
when the first reception quality is better than the second reception quality, the determining section outputs, as the first command, a command to generate, from the transmission signal, the first relay signal comprising the information bits, and outputs, as the second command, a command to generate, from the transmission signal, the second relay signal comprising the parity bits.

11. A wireless transmission apparatus comprising:
a transmitting section that transmits a transmission signal for a communicating party apparatus, to a plurality of relay station apparatuses, each of the plurality of relay station apparatuses generating a relay signal from the transmission signal and transmitting the generated relay signal to the communicating party apparatus;
a determining section that outputs a first command to generate a first relay signal from the transmission signal and a second command to generate a second relay signal from the transmission signal, the second relay signal being different from the first relay signal and combinable with the first relay signal at the communicating party apparatus that receives the first relay signal and the second relay signal;
a reporting section that reports the first command to a first relay station apparatus from among the plurality of relay station apparatuses, and reports the second command to a second relay station apparatus, different from the first relay station apparatus, from among the plurality of relay station apparatuses; and
an adding section that adds first parity bits to the transmission signal, wherein:
the determining section outputs, as the first command, a command to add, to the transmission signal, second parity bits different from the first parity bits, and outputs, as the second command, a command to add, to the transmission signal, third parity bits different from both of the first parity bits and the second parity bits.

12. A wireless transmission method in a wireless transmitting apparatus, the wireless transmission method comprising:
- transmitting a transmission signal for a communicating party apparatus, to a plurality of relay station apparatuses, each of the plurality of relay station apparatuses generating a relay signal from the transmission signal and transmitting the generated relay signal to the communicating party apparatus;
- outputting a first command to generate a first relay signal from the transmission signal and a second command to generate a second relay signal from the transmission signal, the second relay signal being different from the first relay signal and combinable with the first relay signal at the communicating party apparatus that receives the first relay signal and the second relay signal; and
- reporting the first command to a first relay station apparatus from among the plurality of relay station apparatuses, and reporting the second command to a second relay station apparatus, different from the first relay station apparatus, from among the plurality of relay station apparatuses, wherein:
- the first command comprises a command to add first parity bits to the transmission signal in the first relay station apparatus, and the second command comprises a command to add second parity bits, different from the first parity bits, to the transmission signal in the second relay station apparatus.

13. A wireless transmission method in a wireless transmitting apparatus, the wireless transmission method comprising:
- transmitting a transmission signal for a communicating parry apparatus, to a plurality of relay station apparatuses, each of the plurality of relay station apparatuses generating a relay signal from the transmission signal and transmitting the generated relay signal to the communicating party apparatus;
- outputting a first command to generate a first relay signal from the transmission signal and a second command to generate a second relay signal from the transmission signal, the second relay signal being different from the first relay signal and combinable with the first relay signal at the communicating party apparatus that receives the first relay signal and the second relay signal; and
- reporting the first command to a first relay station apparatus from among the plurality of relay station apparatuses, and reporting the second command to a second relay station apparatus, different from the first relay station apparatus, from among the plurality of relay station apparatuses, wherein
- the first command comprises a command to generate, from the transmission signal, the first relay signal comprising information bits and parity bits, and the second command comprises a command to generate, from the transmission signal, the second relay signal comprising information bits and parity bits with an information bit rate of the second relay signal being different from that of the first relay signal.

14. A wireless transmission method in a wireless transmitting apparatus, the wireless transmission method comprising:
- transmitting a transmission signal for a communicating party apparatus, to a plurality of relay station apparatuses, each of the plurality of relay station apparatuses generating a relay signal from the transmission signal and transmitting the generated relay signal to the communicating party apparatus;
- outputting a first command to generate a first relay signal from the transmission signal and a second command to generate a second relay signal from the transmission signal, the second relay signal being different from the first relay signal and combinable with the first relay signal at the communicating party apparatus that receives the first relay signal and the second relay signal; and
- reporting the first command to a first relay station apparatus from among the plurality of relay station apparatuses, and reporting the second command to a second relay station apparatus, different from the first relay station apparatus, from among the plurality of relay station apparatuses, wherein
- the first command comprises a command to generate, from the transmission signal, the first relay signal comprising one of the group of information bits and parity bits, and the second command comprises a command to generate, from the transmission signal, the second relay signal comprising the other one of the group of information bits and parity bits.

* * * * *